United States Patent [19]

Graebner

[11] Patent Number: 5,040,414

[45] Date of Patent: Aug. 20, 1991

[54] ANALYZING A HYDROCARBON RESERVOIR BY DETERMINING THE RESPONSE OF THAT RESERVOIR TO TIDAL FORCES

[76] Inventor: Peter Graebner, 1601 W. Macarthur, #12F, Santa Ana, Calif. 92704

[21] Appl. No.: 374,193

[22] Filed: Jun. 29, 1989

[51] Int. Cl.$^5$ ............................................. G01V 9/00
[52] U.S. Cl. ...................................... 73/151; 73/152; 73/382 R
[58] Field of Search ................. 73/151, 152, 382 G, 73/382 R; 166/250

[56] References Cited

U.S. PATENT DOCUMENTS

| | | | |
|---|---|---|---|
| 3,810,387 | 5/1974 | Stancliff | 73/151 |
| 4,121,464 | 10/1978 | Geiger | 73/382 |
| 4,159,643 | 7/1979 | Watkins | 73/155 |
| 4,212,198 | 7/1980 | Divine | 73/151 |
| 4,244,223 | 1/1981 | Geiger | 73/382 G |
| 4,491,022 | 1/1985 | de la Cruz | 73/783 |
| 4,509,552 | 4/1985 | Eicher et al. | 137/557 |
| 4,523,465 | 6/1985 | Fasching et al. | 73/290 |
| 4,545,245 | 10/1985 | Sharp | 73/290 |
| 4,562,375 | 12/1985 | Besson et al. | 310/338 |
| 4,620,189 | 10/1986 | Farque | 340/856 |
| 4,625,548 | 12/1986 | Charter | 73/299 |
| 4,637,463 | 1/1987 | McCoy | 166/250 |
| 4,646,083 | 2/1987 | Woods | 340/856 |
| 4,646,871 | 3/1987 | Wolf | 181/106 |
| 4,733,567 | 3/1988 | Serata | 73/784 |
| 4,739,653 | 4/1988 | Kathel | 73/151 |
| 4,793,178 | 12/1988 | Ahern et al. | 73/151 |

FOREIGN PATENT DOCUMENTS 955191  4/1964  United Kingdom ............. 73/382 G

OTHER PUBLICATIONS

Arditty, Patricia, C. et al., "Response of a Closed Well-Reservoir System to Stress Induced by Earth Tides", *Society of Petroleum Engineers*, Fall, 1978.

Castaneda et al., "Location of Production Zones with Pressure Gradient Logging", *Transactions*, vol. 5, Oct. 1981.

Danby, J. M. A., "Fundamentals of Celestial Mechanics", The MacMillan Company, pp. 86–118.

Dehlinger, P., "Marine Gravity", *Elsevier Scientific Publishing Company*, pp. 290–294.

Faller, J. E., "Results of an Absolute Determination of the Acceleration of Gravity", *Journal of Geophysical Research*, vol. 70, No. 16, pp. 4035–4038.

Faller, J. E., et al., "Plans for the Development of a Portable Absolute Gravimeter with a Few Parts in $10^9$ Accuracy", *tectonophysics*, vol. 52, pp. 107–116.

Goguel, J., "A Universal Table for the Prediction of the Lunar-Solar Correction in Gravimetry", *Geophysical Prospecting*, vol. 2, pp. 2–31.

Harrison, J. C., "New Computer Programs for the Calculation of Earth Tides", *Report of the Cooperative Institute for Research in Environmental Science*.

Hanson, Jonathon M., "Fracture Orientation Analysis by the Solid Earth Tidal Strain Method", *Society of Petroleum Engineers*, Fall, 1982.

*Primary Examiner*—Hezron E. Williams
*Assistant Examiner*—Craig Miller
*Attorney, Agent, or Firm*—E. A. Schaal; E. J. Keeling

[57] ABSTRACT

A method is disclosed for determining a component of the response of a reservoir to tidal forces (such as the amplitude of variation or delay time) in a hydrocarbons reservoir. That method comprises measuring a variable responsive to tidal forces within the reservoir over a measurement time period, determining a theoretical earth-tide for the reservoir over that measurement time period, and determining the component of the response to tidal forces by comparing the variable measurements and the theoretical earth-tide determinations. Examples of variables that are responsive to the tidal forces are fluid level in a borehole, pressure, and borehole stress. The measurement time period should be sufficiently long so that both a maximum and minimum variable measurement is achieved during that time period (e.g., fourteen or twenty-four hours).

37 Claims, 3 Drawing Sheets

OTHER PUBLICATIONS

Hemala et al., "Tidal Effect in Petroleum Well Testing", *BHP Petroleum Pty Ltd.*

Melchior, P., "The Tides of the Planet Earth", *Pergamon Press*, pp. 447–457.

Parker, S. P., "1989 McGraw-Hill Dictionary of Scientific and Technical Terms", McGraw-Hill Book Company, p. 600.

Pettit, J. T., "Tables for the Computation of the Tidal Accelerations of the Sun and Moon", *Transactions American Geophysical Union*, vol. 35, No. 2, pp. 193–201.

Saeedi, Jawaid, "Interpretation and Use of Vertically Distributed Pressures from Repeat Formation Tester Measurements", *Petroleum Society of CIM* Paper No. 86-37-36.

Schureman, P., "1941 Manual of Harmonic Analysis and Prediction of Tides", United States Coast and Geodetic Survey Special Publication 98.

Stacy, F. D., "Physics of the Earth", (Second Edition), *John Wiley and Sons*, pp. 73–105.

Sethi, D. K., "The Formation Multi-Tester—Its Basic Principles and Practical Field Applications", *SPWLA Twenty-First Logging Symposium*, Jul. 1990.

Hanson, Jonathon M., "Reservoir Response to Tidal and Barometric Effects", *Transactions*, vol. 4, Sept. 1980.

ANALYZING A HYDROCARBON RESERVOIR BY DETERMINING THE RESPONSE OF THAT RESERVOIR TO TIDAL FORCES

The present invention relates to a method for determining at least one component of the response of a hydrocarbon reservoir to tidal forces. With this invention, one can determine the effectiveness of a production operation in a single borehole or in a whole reservoir, or compare reservoir responses at a multitude of boreholes within the same reservoir.

BACKGROUND OF THE INVENTION

The present invention uses a variable previously not used by petroleum geologists—the response of a reservoir to tidal forces.

The word "tide" generally invokes an image of a changing water level at a shoreline, but the moon and the sun also cause tides in the atmosphere, they cause tides in the solid earth, and they cause changes to reservoirs within the solid earth. The "earth-tide" is associated with a periodic dilation and constriction of the earth's crust caused both by the gravitational attraction of the earth to the moon and the sun (other celestial bodies being too far away to appreciably influence the earth) and by the changing weight loads caused by the water tide and atmospheric tide. The present invention is based in part on the fact that hydrocarbon reservoirs respond to this periodic deformation of the earth and to the forces that cause this periodic deformation.

Basic Definitions

By "earth-tide," we mean the periodic movement in the earth's crust caused by the gravitational attraction of the moon and the sun occurring unequally on different parts of the earth.

By "response of a reservoir to tidal forces," we mean the periodic movement of fluids within a reservoir caused by the same forces that produce the earth-tide at that location. Another name for this response is the "reservoir-tide."

Gravity-related quantities are usually vectors and thus have a magnitude and direction. While the usual assumption is that reported values of gravity are the vertical component of the gravitational attraction, gravity has components in all three dimensions.

By "gravitational attraction," we mean the mutual attraction of all masses in the universe.

By "gravity," we mean measured values of the gravitational attraction between the earth and some object. Gravity includes other sources of acceleration which cannot be distinguished from gravitational attraction. These are:

a rotational acceleration,
the fictitious Coriolis acceleration, and
the acceleration due to the effects of the earth-tide.

The rotational acceleration is the acceleration of the object due to its rotation about the earth's axis of rotation. This acceleration is directed perpendicular to the axis with a positive component upward (thus it is opposite to the direction of gravitational attraction).

The fictitious Coriolis acceleration must be considered if gravity measurements are made from a moving vehicle. This acceleration would not normally be a factor in the present invention. First described in 1835 by Gaspard G. Coriolis, this acceleration is usually considered when the coordinate system which describes the location where gravity measurement is made is not itself accelerating (i.e., the measurement is considered in an inertial reference frame). The Coriolis acceleration was invented to balance the acceleration which is actually experienced by a moving observer (at a measurement location) but is not accounted for because the observer has considered the measurements in a non-accelerating inertial reference frame.

The acceleration due to the effects of the earth-tide is the periodic time-varying portion of the earth's gravity field due to the changes in the relative positions of the sun, moon, and earth. This acceleration is the acceleration of interest in the present invention.

By "absolute gravity," we mean the constant value of gravity at some given location in units of cm/sec$^2$ or gals (1 gal = 1 cm/sec$^2$). Absolute gravity is determined at a location by determining the time-varying portion of the gravity field and removing that time-varying portion from the raw measured values of gravity. Time-variations of gravity are mainly due to the changing earth, water, and atmospheric tides that are raised and lowered by the changing relative positions of the earth, moon, and sun. The values of the vertical component of gravity vary between 978 and 984 gals over the surface of the earth. Absolute gravity is a constant value at any given location. Man-made changes in the mass distribution near a location where gravity is measured can also cause changes in absolute gravity. Likewise, catastrophic events such as earthquakes can also cause changes in absolute gravity.

By "gravity meter," we mean a highly sensitive weighing device used for relative measurement of the force of gravity by detecting small weight differences of a constant mass at different locations or at different times at the same location.

An "absolute gravity meter" is a device that measures the absolute value of the earth's gravitational field. Usually that device is simple in concept, such as a falling weight or a pendulum. Only a very well designed device is capable of accuracy of the order of 1 part per billion.

A typical absolute gravity meter is that designed by Professor James E. Faller. This device and its operation are described in the following references.

Faller, J. E., 1965, Results of an absolute determination of the acceleration of gravity; Journal of Geophysical Research, Volume 70, number 16, pages 4035–4038.

Faller, J. E., R. L. Rinker and M. A. Zumberge, 1979, Plans for the development of a portable absolute gravimeter with a few parts in 109 accuracy; Tectonophysics, Volume 52, pages 107–116.

By "gravity calibration range," we mean a series of marked locations where gravity varies between each location, and absolute gravity is established at each location using an absolute gravity meter. The range can be considered to be a measurement standard. A gravity meter can be used to perform measurements at the locations of the gravity range, and the relative changes observed using the relative gravity meter can be compared with the absolute changes established using the absolute gravity meter. The comparison allows the computations of appropriate corrections that will, when applied, transform the relative changes into changes that are consistent with the measurement standard provided by the gravity calibration range.

By "calibrated absolute gravity," we mean an absolute gravity measurement that has been verified by an absolute standard. It is difficult to calibrate an absolute gravity meter without resorting to the use of another absolute gravity meter.

By "calibrated relative gravity," we mean a measured difference in gravity performed by a gravity meter that has been calibrated using a gravity calibration range established using an absolute gravity meter. A calibrated relative gravity difference implies that the units of measurement are properly in units of gals.

By "calibrated gravity," we mean a gravity measurement that has either been verified by an absolute standard (calibrated absolute gravity) or has been performed by a gravity meter that has been calibrated using a gravity calibration range established using an absolute gravity meter (calibrated relative gravity).

| Brief Glossary Of Astronomical Terms | |
|---|---|
| anomalistic period | the interval between two successive perigee passages of a satellite about a primary object (also known as perigee-to-perigee period). |
| anomalistic month | 27 days, 13 hours, 18 minutes, and 33.16 seconds (27.5545505 days). |
| ascending node | the point at which a satellite crosses to the north side of the equatorial plane of its primary. |
| celestial equator | the primary great circle of the celestial sphere (an imaginary sphere of indefinitely large radius) in the equatorial system, everywhere 90 degrees from the celestial poles--the intersection of the extended plane of the equator and the celestial sphere. |
| coordinated universal time | a version of universal time that represents a smooth (and fictitious) rotation of the earth--Since January 1, 1972, the time scale provided by most broadcast time services is based upon coordinated universal time (UTC). |
| eccentricity | one of five elements that describe an elliptical orbit uniquely (inclination to the longitude of the ascending node). |
| ecliptic | the apparent path of the sun among the stars. |
| ephemeris time | the uniform measure of time defined by the laws of dynamics and determined in principle from the orbital motions of the planets. |
| equinox | either of the two points of intersection of the ecliptic and the celestial equator, occupied by the sun when its declination is zero degrees. |
| gravity magnification factor | a number usually between 1.130 and 1.240 which is used as a multiplier to increase the magnitude of the computed values of the earth-tide. The computed values without application of the earth-tide are based on the assumption that the earth is a rigid body. |
| arbitrary gravity magnification factor | an estimated gravity magnification factor used as a first approximation of the gravity magnification factor. |
| calibrated gravity magnification factor | a gravity magnification factor that has been determined by a comparison between measured gravity and computed gravity over an identical time period which is long enough to include a local minimum and a local maximum of the gravity signal due to the earth-tide. The gravity meter used in this comparison must have itself been calibrated on a gravity calibration range where the measurements on the range are performed using an absolute gravity meter. |
| hour angle | angular distance west of a celestial meridian (or hour circle). |
| Julian century | a unit of ephemeris time which is useful to relate the orbital position of the earth to ephemeris time. (36525 days). |
| nodical month | the average period of revolution of the moon about the earth with respect to the moon's ascending node. [27 days, 5 hours, 5 minutes, and 35.81 seconds (27.212220 days)]. |
| perigee | the point in the orbit of the moon nearest the earth. |
| right ascension | the angular distance taken along the celestial equator from the vernal equinox eastward to the hour circle of a given celestial body. |
| sidereal | refers to a quantity such as time to indicate that it is measured in relation to the apparent motion or position of the stars. |
| sidereal period of the moon | 27 days, 7 hours, 43 minutes, and 11.60 seconds (27.321662 days). |
| sidereal year | 365.2564 days. |
| tropical | a period of revolution with respect to the vernal equinox. |
| tropical month | the average period of revolution of the moon about the earth with respect to the vernal equinox. [27 days, 7 hours, 43 minutes, and 4.66 seconds (27.3215817 days)]. |
| tropical year | the period of one revolution of the earth about the sun measured between successive vernal equinoxes. [365 days, 5 hours, 48 minutes, and 46 seconds]. |

To understand earth-tides and reservoir-tides, consider the sun-earth system and the earth-moon system in isolation, as shown in FIGS. 1 and 2.

Referring to FIG. 1, the center of the earth (C) travels at a constant linear velocity in its orbit around the sun. This constant linear velocity is exactly the magnitude required to maintain an orbit. Since both centrifugal force and linear velocity vary proportionally to the distance from the center of rotation, the point (N) on earth nearest the sun has less centrifugal force, and less linear velocity, than at the center of the earth and will thus tend to move toward the sun. The point (F) on the far side of the earth has more centrifugal force, and more linear velocity, and will thus tend to move away from the sun.

Referring to FIG. 2, the earth and the moon rotate about a common axis (A), contained within the earth. A point (N') on the side of the earth nearest the moon experiences a greater gravitational attraction than a point on the common axis. Point N' also experiences an outward normal acceleration due to its rotation about the common axis and this acceleration has a positive component directed toward the moon. A point (F') on the side of the earth farthest from the moon has less gravitational attraction to the moon and has a positive component of centrifugal acceleration directed away from the moon.

Thus the movement of earth in orbit around the sun and the movement of the moon around the earth have similar consequences but for different reasons. Each phenomenon contributes to symmetric bulges on opposite sides of the earth. The observed tidal deformation of the earth is the complex superposition of these two pairs of bulges.

The earth-tide can be observed by the type of standard gravity meter used in hydrocarbon and minerals exploration. Such a gravity meter can define the earth-tide's smooth regularity. The earth-tide's dominant periodicity is approximately twelve hours.

Table A lists the major known components which combine to form the observable earth-tide. Note that the influence of the moon is about twice that of the sun.

TABLE A

| Common Symbol | Component Name | Period | Relative Amplitude |
|---|---|---|---|
| $M_2$ | principal lunar | 12.42 h | 0.454 |
| $S_2$ | principal solar | 12.00 h | 0.212 |
| $N_2$ | larger lunar elliptic | 12.66 h | 0.088 |
| $K_2$ | lunisolar | 11.97 h | 0.058 |
| $K_1$ | lunisolar | 23.93 h | 0.266 |
| $O_1$ | larger lunar | 25.82 h | 0.189 |
| $P_1$ | larger solar | 24.07 h | 0.088 |
| $M_f$ | lunar fortnightly | 13.66 days | 0.078 |
| $S_{sa}$ | solar semi-annual | ½ year | 0.037 |
|  | nineteen yearly | 19 years | 0.033 |

Gravity changes are measured in gals (1 gal = 1 cm/sec$^2$). The useful unit for tidal gravity measurements is the microgal, which is one-millionth of a gal. One microgal is roughly one-billionth of the vertical component of the earth's gravity field. The total range of earth-tide induced gravity is within the limits of +300 microgals to −300 microgals.

In shallow (ground water) aquifers the earth-tide manifests itself as a small periodic rise and fall of the water levels in wells. The relationship between the changing water levels and the changing position of the moon was recognized as early as the first century A.D. by Pliny the Elder. Compared to the minute (a few parts in 10$^8$) dilation or constriction of the earth's crust, the amplitude of the periodic rise and fall of the water level is usually at least a few centimeters. This same effect occurs in hydrocarbon reservoirs.

If the earth were a rigid body, the earth-tide would be accurately predicted to better than one microgal. This is practically the case with our actual elastic earth, but not exactly. There are two limitations in our current capability for predicting the earth-tide. These are:

1. The effect of depth on the changing nature of the dilation and constriction of the earth is not exactly known.
2. The theoretical earth-tide due to a rigid earth is only a first approximation to the observed earth-tide. The observed amplitudes are about twenty percent larger than those predicted from the rigid-earth theory.

For a given location on earth, the magnification of the theoretical earth-tide appears to be a constant and is called the "gravity magnification factor," as defined above. This gravity magnification factor varies between 1.13 and 1.24 for all locations on the surface of the earth.

These two limitations are not severe. The effect of depth on earth-tide induced dilations and constrictions is evidently small, causing changes of less than a few microgals. The gravity magnification factor is easy to determine for any location by using a properly calibrated gravity meter to perform measurements at the location and comparing the computed and measured earth-tides to reveal the appropriate gravity magnification factor for the area.

The variations in the water-tide, as observed on an ocean or other large body of water, also influence the hydrocarbon reservoir. This is because at high-tide there is a greater mass of water above the reservoir and at low tide there is a lesser mass of water above the reservoir. This variation in mass amounts to a variation in the load of earth above the reservoir. The effect of this variation in load is that the reservoir constricts and dilates in the vertical dimension which, like the effects of the earth-tides, is manifested as changes in the fluid-level in a borehole.

The variations in the atmospheric tide are difficult to measure because they are much smaller in magnitude than either the earth-tide or the water-tide, but they also influence the hydrocarbon reservoir. The atmosphere is a load on the surface of the entire earth in the same way that the oceans are loads on the ocean-bottom.

The load of the atmosphere on the earth varies with time for reasons other than the atmospheric tides. One cause is the changing weather patterns. These weather-related effects can be much larger than the effects of the atmospheric tides. A thicker or more dense air mass causes a higher pressure at points on the surface of the earth. A thinner or less dense air mass causes a lower pressure.

One previous approach to locating potentially hydrocarbon-bearing subsurface formations is disclosed in two patents that issued to Allen R. Geiger (U.S. Pat. No. 4,244,223, which issued on Jan. 13, 1981, and U.S. Pat. No. 4,121,464, which issued on Oct. 24, 1978, both patents entitled "System and method for geophysical prospecting by measurement of earth tides"). Both patents are hereby incorporated by reference for all purposes.

These patents disclose using tiltmeters to measure the rise and fall of the earth's surface due to the earth-tide to establish the time arrival and apparent direction of a geoid tidal wave at each tiltmeter, and combining the time and direction measurements to establish the tidal wave shape in a region of interest. The wave shape is supposedly indicative of the viscosity in the region. While these methods attempt to measure "earth-tide," they would not determine a component of the response of the hydrocarbon reservoir to tidal forces.

SUMMARY OF THE INVENTION

The present invention is a method for determining a component of the response of a hydrocarbon reservoir to tidal forces. Previously the response of a reservoir to tidal forces was considered as mere "noise" in measurements of the reservoir properties, but we have discovered that this "noise" contains valuable information about the reservoir.

The present invention comprises measuring a variable responsive to tidal forces within the reservoir over a measurement time period, determining a theoretical earth-tide for the reservoir over the measurement time period, and determining the component of the response to tidal forces by comparing the variable measurements and theoretical earth-tide determinations.

Examples of variables responsive to tidal forces are fluid level within a borehole, pressure, and borehole stress. Preferably, it is a pressure measured within the liquid phase of the reservoir. More preferably, it is a combination of pressure measurements that are measured both within and outside of the liquid phase of the reservoir.

The measurement time period should be sufficiently long so that both a maximum and minimum variable measurement is achieved during that time period. Preferably, that time period is at least fourteen hours long, more preferably at least twenty-four hours long.

Examples of possible components of the response to tidal forces include the amplitude of variation of the response, the delay time of the response, and a combination thereof. Preferably, the amplitude of variation is the absolute amplitude of variation of the response. The amplitude of variation and the delay time of the response to tidal forces can be factored out from the variable measurements to reveal the residual time serials.

A calibrated gravity magnification factor should be used in determining the theoretical earth-tide. That gravity magnification factor is determined by: measuring calibrated gravity at the reservoir over a reference time period, determining a first approximation of the theoretical earth-tide for the reservoir over the reference time period using an arbitrary gravity magnification factor, and determining the calibrated gravity magnification factor for the reservoir by comparing the gravity measurements and first approximation of the theoretical earth-tide determinations. The reference time period should be sufficiently long so that both a maximum and minimum gravity measurement is achieved during that time period (preferably at least fourteen hours long, more preferably at least twenty-four hours long). Preferably, the calibrated gravity is calibrated relative gravity.

In one embodiment of the present invention, the effectiveness of a production operation in a given borehole in a reservoir is determined by determining a component of the response of a reservoir to tidal forces over a first measurement time period, subjecting the reservoir to the production operation after the first measurement time period, determining the same component of the response of the reservoir to tidal forces over a second measurement time period after the first measurement time period and after the beginning of the production operation, and comparing the component of the response of the reservoir to tidal forces for the first and second measurement time periods.

For instance, the effectiveness of a production operation in a given borehole in a reservoir is determined by measuring a variable responsive to tidal forces within the reservoir over a first measurement time period, determining the amplitude of variation of the variable measurements for the first measurement time period, subjecting the reservoir to the production operation after the first measurement time period, measuring the same variable responsive to tidal forces within the reservoir over a second measurement time period after the first measurement time period and after the beginning of the production operation, determining the amplitude of variation of the variable measurements for the second measurement time period, and comparing the amplitudes of variation of the variable for the first and second measurement time periods. Both the first and second measurement time periods should be sufficiently long so that both a maximum and minimum variable measurement is achieved during each time period.

In an example of this embodiment, the effectiveness of a steamflood in a given borehole in a reservoir could be determined by measuring downhole pressure over a first measurement time period, then subjecting the reservoir to the steamflood operation, then measuring downhole pressure over a second measurement time period, and comparing the amplitudes of pressure variation for those two measurement time periods. The change in those amplitudes of pressure variations would indicate the effectiveness of the steamflood.

In another embodiment, the reservoir properties in at least two different boreholes in the same reservoir are compared by determining the same component of the response of a reservoir to tidal forces at each of the boreholes, and comparing that same component of the response for each of the boreholes.

For instance, the embodiment can comprise: measuring at each borehole over a measurement time period the same variable responsive to tidal forces, determining the amplitude of variation of the variable at each borehole from the variable measurements for the measurement time period, and comparing the amplitudes of variation of the variable at each borehole. To determine amplitude of variations, the measurement time period must be sufficiently long so that both a maximum and minimum variable measurement is achieved during that time period. In an example of this embodiment, the downhole pressures can be measured simultaneously at two boreholes, then the amplitudes of pressure variations for those boreholes could be compared to determine differences in the volumes of fluid in contact with each borehole.

Or, for instance, the embodiment can comprise measuring, at each borehole over a measurement period, the same variable responsive to tidal forces, and determining the relative delay in the variable at each borehole. In an example of this embodiment, the downhole pressures can be measured simultaneously at two boreholes, then the relative delay in pressure is determined to determine differences in resistance to fluid flow around each borehole.

In still another embodiment of the present invention, the spatial effectiveness of a production operation in a reservoir is determined by determining a component of the response of a reservoir to tidal forces at a plurality of boreholes over a first measurement time period, subjecting the reservoir to the production operation after the first measurement time period, determining the same component of the response of the reservoir to tidal forces at those boreholes over a second measurement time period after the first measurement time period and after the beginning of the production operation, and comparing the component of the response of the reservoir to tidal forces for the first and second measurement time periods for each borehole to determine the spatial effectiveness of that production operation. By "spatial effectiveness", we mean the three-dimensional nature of the influence of the production operation within the reservoir.

The purpose of many production operations is increased hydrocarbon production. One important measure of the effectiveness of a production operation is the degree to which hydrocarbon production is increased or maintained as a consequence of the production operation. Other aspects of effectiveness include the spatial influence of the production operation and the time required for the influence. For example, a given production operation such as a water flood, may cause an increase in hydrocarbon production but might be judged ineffective if large portions of the reservoir were not influenced or if a long time period were required to gain the increased hydrocarbon production.

"Spatial effectiveness" can also be used in the context of a prediction prior to the initiation of a given production operation. The "amplitude of variation" and the "delay time" might be important variables which could be used to estimate the "spatial effectiveness" of a proposed production operation prior to the initiation of the production operation.

In one embodiment, the spatial effectiveness of a production operation in a reservoir is determined by measuring a variable responsive to tidal forces at a plurality of boreholes within the reservoir over a first measurement time period, determining the amplitudes of variation of the variable measurements for the first measurement time period, subjecting the reservoir to the production operation after the first measurement time period, measuring the same variable responsive to tidal forces at those boreholes over a second measurement time period after the first measurement time period and after the beginning of the production operation, determining the amplitude of variation of the variable measurements for the second measurement time period, and comparing the amplitudes of variation of the variable for the first and second measurement time periods for each borehole to determine the spatial effectiveness of that production operation. Both the first and second measurement time periods should be sufficiently long so that both a maximum and minimum variable measurement is achieved during each time period.

BRIEF DESCRIPTION OF THE DRAWINGS

In order to facilitate the understanding of this invention, reference will now be made to the appended drawings of preferred embodiments of the present invention. The drawings are exemplary only, and should not be construed as limiting the invention.

DETAILED DESCRIPTION OF THE PREFERRED EMBODIMENTS

Figure 1:
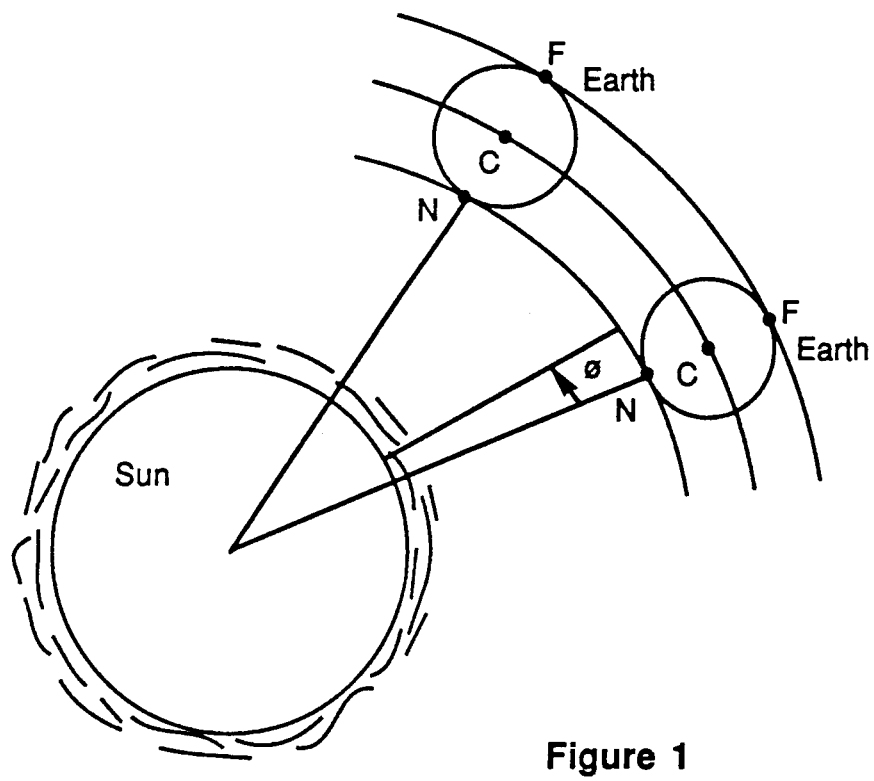
FIG. 1 is a schematic drawing of the Sun-Earth system used to explain the effects of the sun's gravitational forces on the earth.
Figure 2:
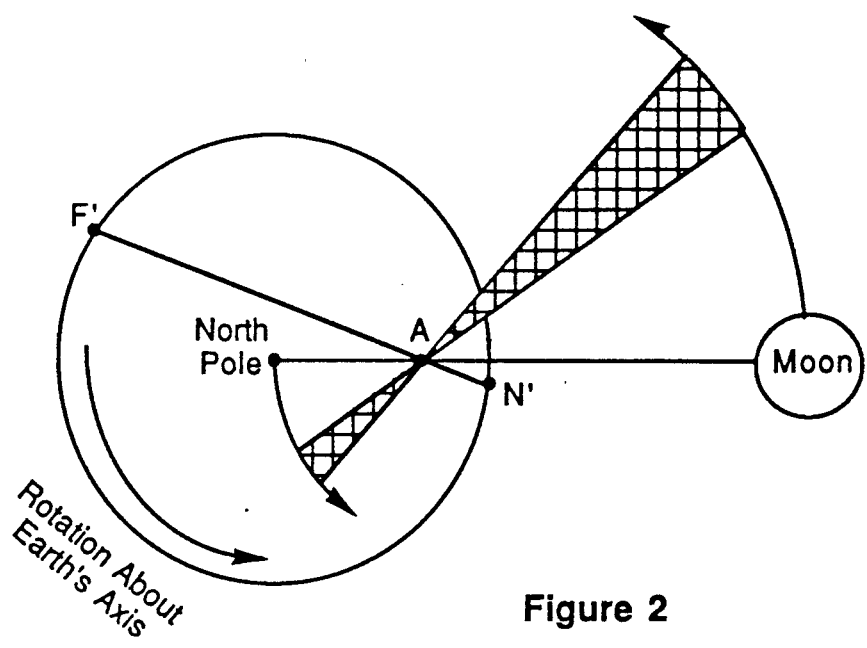
FIG. 2 is a schematic drawing of the Earth-Moon system used to explain the effects of the moon's gravitational forces on the earth.

In its broadest aspect, the present invention is a method for determining a component of the response of a hydrocarbon reservoir to tidal forces. It involves measuring a variable responsive to tidal forces within the reservoir over a measurement time period, determining a theoretical earth-tide for the reservoir over that measurement time period, and determining the component of the response to tidal forces by comparing the variable measurements and the theoretical earth-tide determinations. The response to tidal forces can be used either directly to characterize the reservoir or it can be factored out of the measured signal to reveal the part of the measurement that does not respond to the tidal forces. Sometimes, as discussed below in alternative embodiments, it is possible to get rough information about the reservoir without using theoretical earth-tide determinations.

The Variable Responsive to Tidal Forces

By "variable responsive to tidal forces," we mean a variable that is measurably affected by the tidal forces. There are a variety of these variables. They include, for example, fluid level in a borehole, pressure, and borehole stress.

Fluid Level Measurements

By "fluid level," we mean the instantaneous elevation of the upper surface of the fluid which fills the lower portion of a borehole in the earth. The elevation which characterizes the fluid level is measured with respect to a reference elevation. One common reference elevation is mean sea level as established by U.S. Government agencies. A point on the surface of the earth near the borehole would be adequate as a reference elevation. Due consideration can be made for slight changes in the reference elevation in response to tidal forces, but in most applications these slight changes can be ignored.

The fluid level can be measured by a variety of means. One means is visual examination. This is applicable when the fluid level is near the top of the borehole. A meter stick could be fastened to the inside of the borehole and the time changes in the fluid level could be noted directly.

Another common method of measurement employs a winch, a wireline, and a wireline odometer. It can be performed during a wireline logging operation. In this method, a logging sonde is suspended on a wireline in the borehole in a logging operation which includes measurements where the sonde is located below the fluid level in the borehole. At the completion of the operation, the sonde is brought to the surface using the winch. The wireline odometer provides a continuous reading of the depth of the sonde below the surface during the entire period of time when the sonde is in the borehole. Two readings (depths) of the odometer are required to determine the depth of the borehole fluid level below the surface. The first reading is the deepest depth attained by the sonde. The second reading is the depth of the sonde when the "fluid mark" on the wireline is at the surface. This "fluid mark" is simply a demarcation on the wireline where it is dry above the "fluid mark" and wet below the "fluid mark". The depth of the borehole fluid level below the surface is the value obtained when the second reading is subtracted from the first reading.

There are other techniques for measuring the borehole fluid level. These include measuring the travel time of a seismic wave that travels down the air column within the borehole, reflects from the upper surface of the borehole fluid, and returns up the air column within the borehole to the surface. Knowledge of the temperature of the air column and the speed of a seismic wave in air are required data to estimate the depth of the fluid level below the surface. Examples of current technology of fluid level measurement are given in the following patents, all of which are hereby incorporated by reference for all purposes:

U.S. Pat. No. 4,793,178 entitled "Method and Apparatus For Generating Data And Analyzing The Same To Determine Fluid Depth In A Well"

U.S. Pat. No. 4,646,871 entitled "Gas-Gun For Acoustic Well Sounding"

U.S. Pat. No. 4,637,463 entitled "Echo Ranging Gun"

U.S. Pat. No. 4,625,548 entitled "Hydrostatic Head Pressure Sensors For A System To Determine Fluid Level And Weight"

U.S. Pat. No. 4,545,245 entitled "Liquid level Sensor Using Sonic Methods"

U.S. Pat. No. 4,523,465 entitled "Wireless Remote Liquid Level Detector And Indicator For Well Testing"

U.S. Pat. No. 4,509,552 entitled "Gas Gun For Determining The Liquid Level Of A Well"

Except for the method of visual examination, none of the methods described above provide adequate accuracy for determining the response of the reservoir to tidal forces.

Pressure Measurements

As discussed above, fluid level measurements offer a means to determine the direct response of the reservoir to tidal forces Pressure measurements can be used to indirectly determine the rise and fall of the fluid level in the borehole if the pressure sensor is placed in the borehole at a location below the level of fluid that partially fills the borehole. That sensor would be fastened to the inside of the borehole at a point below the lowest fluid level, so that the sensor will be below the fluid level throughout the measurement time. Such pressure measurements offer an indirect means which can be associated with a higher accuracy than could be achieved by some direct fluid level measurements.

In one embodiment, a pressure sensor is placed at the bottom of a borehole and continuous measurements are performed. The measured downhole pressure response is the combination of three individual effects that are superimposed upon one another to form the single response that is sensed by that pressure sensor.

The first individual effect of the measured downhole pressure response is instrument drift, which is often a significant fraction of the variation of the signal with time. The fictitious variation of pressure with time is due to conditions within the the instrument itself. This apparent variation in pressure is not related to the tidal forces in any way.

The second individual effect of the measured downhole pressure response is the variation in pressure at the sensor due to the changing load of fluid in the borehole (the effect of interest). Assuming that there is a constant volume of reservoir fluid, the fluid level is moving upward and downward within the borehole in response to the constriction and dilation of the vertical dimensions of the reservoir. Those constrictions and dilations are reactions within the elastic crust of the earth to the time variations in the gravitational attractions of the moon and the sun. When the reservoir constricts in the vertical dimension, the overall volume of the reservoir becomes smaller but the volume of fluid in the reservoir remains the same. This reduced reservoir volume forces the fluid level in the borehole to move upward. Likewise, when the reservoir dilates in the vertical dimension, the fluid level moves downward and the volume of the reservoir increases. The movement downward of the fluid level in the borehole is due to the increased reservoir volume.

The third effect of the measured downhole pressure response is a variation in pressure with time that is masked by both the instrument drift signal and the response of the reservoir to tidal forces. This third effect is totally independent of tidal forces. It constitutes the residual time serials.

When the pressure sensor is fixed in the borehole it responds directly to the load of fluid which is above the sensor. The force of the fluid column on the pressure sensor is directly proportional to the product of the mass of the fluid column (above the sensor) and the acceleration of gravity at the location of the borehole. An equivalent description of the magnitude of the force of the fluid column on the pressure sensor is that the force is equal to the weight of that portion of the fluid column which is above the sensor. The direction of the force is vertical downward and is parallel with the direction of the plumb bob at the location of the reservoir.

The sample computations below illustrate the variations in pressure at the location of the pressure sensor which are accurate indirect determinations of the variations in the level of the fluid in the borehole. In these computations, consider a borehole which is lined with vertical, cylindrical steel casing that is partially filled with fluid which is in direct contact with the fluid in the reservoir. When the fluid level rises in the borehole, the additional fluid above the sensor can be characterized by a horizontal disk of fluid. If the borehole fluid is homogeneous, the weight of the additional fluid above the sensor is the product of the volume of the additional fluid and the density of the fluid.

The assumed conditions appropriate to the computations are listed below along with identifying parameter names, dimensions and symbols. The dimensions of a particular quantity is indicated in parentheses.

ID = inner diameter of the casing wall (length)

HF = the vertical change in the height of the fluid level in response to tidal forces; HF is positive when the fluid level rises and negative when the fluid level lowers (length)

R = the difference in density between the homogeneous borehole fluid and the homogeneous column of vapor (normally air) which extends from the fluid level to the top of the borehole (mass/length$^3$)

F = downward force due to the change in weight due to the change in the height of the borehole fluid (mass)

P = the pressure corresponding to "F"(mass/length$^2$)

The actual numerical values used in the computations are provided below in English and metric units:

ID = 7.00 inches = 17.78 centimeters

HF = 1.97, 3.94, and 5.90 inches = 5, 10, and 15 centimeters

R = 0.04335 lb/in$^3$ = 1.20 gm/cc

The relationships among the parameters are:

$$F = \frac{\pi \times D^2 \times HF \times R}{4}$$

$$P = HF \times R$$

The tables below indicates the computed determinations:

| Vertical Change In The Height Of The Fluid Level, HF | Corresponding Change In Pressure At The Pressure Sensor, P |
| --- | --- |
| Metric Units | |
| 5.00 centimeters | 6.00 grams per square centimeter |
| 10.00 centimeters | 12.00 grams per square centimeter |
| 15.00 centimeters | 18.00 grams per square centimeter |
| English Units | |
| 1.97 inches | 0.0854 pounds per square inch |
| 3.94 inches | 0.1708 pounds per square inch |
| 5.90 inches | 0.2557 pounds per square inch |

The computations indicate the simple correlation between changes in fluid level and changes in pressure.

The pressure sensor, as employed in the manner described above, can be placed at any fixed location in the borehole which is below the fluid level during the entire period of time when pressure measurements are performed.

An alternative kind of pressure measurement is where the pressure sensor is placed at the top a borehole which is lined with casing. In this case the upper portion of the borehole is sealed such that the chamber which extends from the fluid level to the closed upper portion is airtight.

When the fluid level rises in response to tidal forces, the column of vapor (usually air) in the upper portion of the borehole is compressed. A pressure sensor within the column of vapor would respond to this compression of vapor as an increase in pressure. Likewise, when the fluid level lowers, the pressure sensor would respond as a decrease in pressure.

Examples of current technology of pressure measurement are given in the following patents, all of which are hereby incorporated by reference for all purposes:

U.S. Pat. No. 4,739,653 entitled "Pressure Gauge"
U.S. Pat. No. 4,646,083 entitled "Borehole Measurement and Telemetry System"
U.S. Pat. No. 4,620,189 entitled "Parameter Telemetering From The Bottom Of A Deep Borehole"
U.S. Pat. No. 4,562,375 entitled "Piezoelectric Transducer, Notably For Pressure Measurement"
U.S. Pat. No. 4,212,198 entitled "Borehole Pressure Sensing System"
U.S. Pat. No. 4,159,643 entitled "Method Of And Apparatus For Bottom Hole Well Pressure"
U.S. Pat. No. 3,810,387 entitled "Apparatus For Recording Conditions At The Surface"

The preferred method of making pressure measurements is to measure pressure changes instead of measuring the actual pressure directly. This can be done by using the apparatus disclosed in the U.S. patent application Ser. No. 374,192 entitled "Apparatus For Measuring Reservoir Pressure Changes," which was filed concurrently with this application and which is hereby incorporated by reference for all purposes. That application discloses an apparatus for the accurate measurement of pressure changes comprising a reference accumulator that has a reference pressure representative of the environment being measured, and a differential pressure transducer connected to the reference accumulator. The differential pressure transducer measures the difference between the reference pressure and the pressure of the environment being measured.

Preferably, as disclosed in that application, that apparatus further comprises:

an electrically remote-controlled valve connected to the reference accumulator that allows the reference accumulator to be charged to a reference pressure and provides protection to the differential pressure transducer from overpressuring;

an isolation means (preferably an isolation bellows), connected to the valve, for protecting the apparatus from the environment being measured;

a data acquisition and control system connected to the differential pressure transducer and to the valve to record measurements from the differential pressure transducer and to control the valve;

a barometer connected to the data acquisition and control system; and a temperature transducer connected to the data acquisition and control system.

Borehole Stress Measurements

The previously discussed fluid-level and pressure measurements that depict the response of the reservoir to tidal forces are mostly related to the vertical components of the constrictions and dilations of the earth's crust. There are horizontal components of the constrictions and dilations of the earth's crust. Knowledge of the vertical components and the horizontal components together provides a more comprehensive understanding of the response of the earth's crust and the hydrocarbon reservoirs within the crust to the tidal forces.

One possible approach to measuring the horizontal component of the constrictions and dilations of the reservoir in response to tidal forces is by means of stress measurements within the borehole. Stress measurements can be made within a borehole where permanent well casing (elongate steel tubes originally of circular cross section which are connected at their ends to form a steel sheath which lines the entire borehole) has been firmly implanted in the borehole. The circular cross-section of the casing (in a horizontal plane) will deform periodically into a variety of elliptical cross-sections in response to tidal forces. Thus a particular diameter of the casing (in a horizontal plane) will change in length in response to tidal forces. The particular diameter will become shorter in response to a constriction of the reservoir in the horizontal direction parallel with the diameter. Likewise, the particular diameter will become longer in response to a dilation of the reservoir in the horizontal direction parallel to the diameter.

Therefore, the changes of the length of a particular diameter of the borehole casing with time is a direct measure of the response of the reservoir to tidal forces. Elements of the response include the amplitude of variations and the delay time of the response. These elements can be used either directly to characterize the reservoir or indirectly by factoring out those elements from the measured signal to reveal the residual time serials of the response (i.e., that part of the measurement that does not respond to the tidal forces).

Examples of current technology of stress measurement are given in the following patents, all of which are hereby incorporated by reference for all purposes:

U.S. Pat. No. 4,733,567 entitled "Method And Apparatus For Measuring In Situ Earthen Stresses And Properties Using A Borehole Probe"

U.S. Pat. No. 4,491,022 entitled "Cone-Shaped Coring For Determining the In Situ State Of Stress In Rock Masses"

Time Periods

There are two types of time periods used in the present invention. They are measurement time periods and the reference time period. The measurement time periods are the time periods used during which a variable responsive to tidal forces is measured. The reference time period is the time period used during which measurements are made to determine the gravity magnification factor.

Any measurement time period or reference time period used should be sufficiently long so that both a maximum and minimum variable measurement is achieved during that time period. By "maximum variable measurement," we mean the highest measurement value of a variable within the time period, wherein that measurement is both preceded and followed by lower measurements. It roughly corresponds to the top of the earth-tide cycle. By "minimum variable measurement," we mean the lowest measurement value of a variable within the time period, wherein that measurement is both preceded and followed by higher measurements. It roughly corresponds to the bottom of the earth-tide cycle. If the highest value or lowest value during a time period occurs either at the beginning or end of the time period, it fails to be a true "maximum or minimum variable measurement."

In the measurement of some variables, instrument drift (i.e., the gradual change in the zero reading of an instrument) might mask the true top and bottom of the earth-tide cycle. In these cases, the time period should be longer than the minimum required to achieve a true "maximum or minimum variable measurement."

Since the earth-tide's dominant periodicity is approximately twelve hours, a time period of at least fourteen hours should be sufficient to achieve a maximum and minimum variable measurement. For better results, a time period of at least twenty-four hours is preferred. As a general rule, the longer the time period the better.

Preferably, all measurements of the variable responsive to tidal forces are performed continuously throughout the time period, but some of the variables are difficult to measure continuously. Those variables can be measured periodically, but they must be measured frequently enough during the measurement time period to find maximum or minimum variable measurements that accurately reflect the top and bottom of the earth-tide cycle. For most cases, a sampling time of every fifteen minutes should be adequate.

If a reference time period is used in determining the gravity magnification factor, that reference time period may start either before, during, or after the measurement time periods. The reference time period and the measurement time period may overlap, be completely separate, or be the same time period.

Theoretical Earth-Tide

This invention is based in part on knowing, or being able to determine, the theoretical earth-tide for the reservoir over the measurement time period in order to be able to determine the component of the response to tidal forces. By "theoretical earth-tide," we mean a mathematical simulation of the time variations in the gravity field at a given place and time interval due to the changing relative positions of the sun, moon, and the place of observation on the earth.

The theoretical earth-tide can be calculated from first principles using the ideas advanced in the field of astronomy and in particular the part of astronomy involving celestial mechanics. Accurate computations can be performed for any location on the earth's surface, at locations above the earth's surface consistent with typical aircraft elevations, and at locations within the earth's crust consistent with drillable depths. The computations can be performed for any specified time.

One popular way to perform the necessary computations is to follow the steps outlined in a scientific paper titled "Formulas For Computing The Tidal Accelerations Due To The Moon And The Sun" by I. M. Longman published 1959 in the Journal of Geophysical Research, Volume 64, Number 12, pages 2351-2355.

Other scientific papers which deal with this topic are:

Bartels, J., 1957, Gezeitenkrafte; in J. Bartels (Group Editor), Handbuch der Physik, Volume 48, (Geophysik II), Berlin, Springer-Verlag, pages 734-774.

Bartels, J., 1957, Tidal Forces; in Harrison, J. C., 1985, Earth tides; New York, Van Nostrand Reinhold Company, pages 25-63 of 419 pages; abridged translation into English of Bartels, 1957 paper (above) by Harrison.

Danby, J. M. A., 1964, Fundamentals of Celestial Mechanics; New York, The MacMillan Company, 348 pages.

Dehlinger, P., 1978, Marine Gravity; New York, Elsevier Scientific Publishing Company, 322 pages.

Dwight, H. B., 1961, Tables of Integrals and Other Mathematical Data; New York, The Macmillan Company, 336 pages.

Goguel, J., 1954, A Universal Table for the Prediction of the Lunar-Solar Correction in Gravimetry (Tidal Gravity Correction): Geophysical Prospecting, Volume 2 (supplement), pages 2-31.

Love, A. E. H., 1911, Some Problems of Geodynamics; Cambridge, Cambridge University Press.

McGraw-Hill, 1987, Encyclopedia of Science and Technology; New York, McGraw-Hill Book Company, 20 volumes.

Melchior, P., 1983, The Tides of the Planet Earth; New York, Pergamon Press, 641 pages.

Parker, S. P. (Editor), 1989, McGraw-Hill Dictionary of Scientific and Technical Terms; New York, McGraw-Hill Book Company, 2065 pages.

Parker, S. P. (Editor), 1984, McGraw-Hill Concise Encyclopedia of Science and Technology; New York, McGraw-Hill Book Company, 2065 pages.

Pettit, J. T., 1954, Tables for the Computation of the Tidal Accelerations of the Sun and Moon; Transactions American Geophysical Union; Volume 35, Number 2, pages 193-201.

Schureman, P., 1941, Manual of Harmonic Analysis and Prediction of Tides; United States Coast and Geodetic Survey Special Publication 98 (revised edition), (reprinted 1958 with corrections).

Schureman, P., 1924, A Manual of the Harmonic Analysis and Prediction of Tides; United States Coast and Geodetic Survey Special Publication 98.

Stacy, F. D., 1977, Physics of the Earth (second edition); New York, John Wiley and Sons, 414 pages.

Takeuchi, H., 1950, On the Earth Tide in the Compressible Earth of Varying Density and Elasticity; Transactions of the American Geophysical Union, Volume 31, page 651.

The framework for the computations is a fictitious spatial arrangement of the earth, moon, and sun. This offers a simplified view of the relationships among the earth, moon and sun which is convenient for computation without loss of accuracy. The earth is considered to be fixed in space. The sun is envisioned as revolving around the earth along a path defined by the ecliptic (apparent annual path of the sun among the stars) which is traced on the celestial sphere (imaginary sphere of indefinitely large radius centered at the earth). The moon is considered to revolve about the fixed earth on a plane which is tilted with respect to the plane containing the earth's equator. Thus the gravitational attraction is computed as if the sun and moon rotated about the center of the earth.

One Method of Calculating Theoretical Earth-Tide

The following is one approach to calculating the theoretical earth-tide. The information required to perform the computation is outlined below:

Input Information Required For Computation

The earth-tide is computed for a particular location or set of locations at a particular time or set of times. The information required for a computation is comprised of a specification of the locations and times. The specific information is:
1. Latitude of location.
2. Longitude of location.
3. Elevation of location with respect to mean sea level.
4. Time associated with the computed value of the earth-tide in terms of year, month, day, hour, minute, and second.
5. Irregular time adjustments such as daylight savings time if appropriate.
6. The gravity magnification factor.

| Information Required For The Computation (not input information) | |
|---|---|
| one degree of arc | 0.01745329 radian |
| $2\pi$ | 6.2831853 |
| eccentricity of the moon's orbit | 0.054900489 [McGraw-Hill] |
| equatorial radius of the earth | $6.378139 \times 10^6$ meters [Stacy] |
| inclination of the earth's equator to the ecliptic | 23.452 degrees [Melchior] |
| inclination of the moon's orbit to the ecliptic | 5.145 degrees [McGraw-Hill] |
| mass of the sun | $1.98876 \times 10^{33}$ grams [Stacy] |
| mass of the earth | $5.9732 \times 10^{27}$ grams |
| mass of the moon | $7.34693 \times 10^{25}$ grams [Stacy] |
| mean distance between centers of the earth and sun | 149,597,870.7 km [Parker] $1.495978707 \times 10^{13}$ cm |
| mean distance between centers of the earth and moon | $3.84405 \times 10^{10}$ cm [Stacy and Danby] |
| polar radius of the earth | $6.35675 \times 10^6$ meters [Stacy] |
| ratio of mean motion of the sun to that of the moon | 0.074804 |
| revolutions of moon about earth in one Julian century | 1336.851 |
| universal gravitational constant | $6.6732 \times 10^{-8}$ cm$^3$ gm$^{-1}$ sec$^{-2}$ [Stacy] |

Steps Of The Computation

The steps below are outlined in terms of the use of various formulas. Those steps are:
1. Organize input data.
2. Compute the distance between the observation point and the geometric center of an ellipsoidal earth.
3. Compute mean longitude (in degrees) of the moon in its orbit reckoned from the referred equinox.
4. Compute mean longitude of lunar perigee.
5. Compute mean longitude of the sun.
6. Compute longitude of moon's ascending node in its orbit reckoned from the referred equinox.
   Specify the inclination of the moon's orbit to the equator.
8. Specify the side of the spherical triangle connecting the nodes where the moon's ascending node is one and the ascending intersection of the moon's orbit with the equator is the other. (This side is commonly named "$\alpha$".)
9. Compute the longitude in the moon's orbit of its ascending intersection with the celestial equator.
10. Compute the mean longitude of the moon (in radians) in its orbit reckoned from the ascending intersection of the moon's orbit with the equator.
11. Compute the longitude of the moon in orbit reckoned from its ascending intersection with the equator.
12. Compute the longitude of the point on the celestial equator of its intersection with the moon's orbit.
13. Compute the hour angle of the mean sun measured westward from the place of observation.
14. Compute the right ascension of the meridian of the place of observation reckoned from the ascending intersection of the moon's orbit with the equator.
15. Specify the zenith angle of the moon.
16. Compute the reciprocal of the distance between the centers of the earth and the moon.
17. Compute the vertical component (upwards away from center of earth) of the lunar tidal force per unit mass at the place of observation.
18. Compute the eccentricity of the earth's orbit.
19. Compute mean longitude of solar perigee.
20. Compute the longitude of the sun in the ecliptic reckoned from the vernal equinox.
21. Compute the right ascension of the meridian of the place of observation reckoned from the vernal equinox.
22. Specify the zenith angle of the sun.
23. Compute the vertical component (upwards away from center of earth) of the solar tidal force per unit mass at the place of observation.
24. Combine the computed vertical components (steps 17 and 23) along with the magnification factor to compute the vertical component of the gravitational attraction at the place of observation due to the moon and the sun.
25. Organize the result of Step 24 with respect to the appropriate sign convention.

Figure 3:
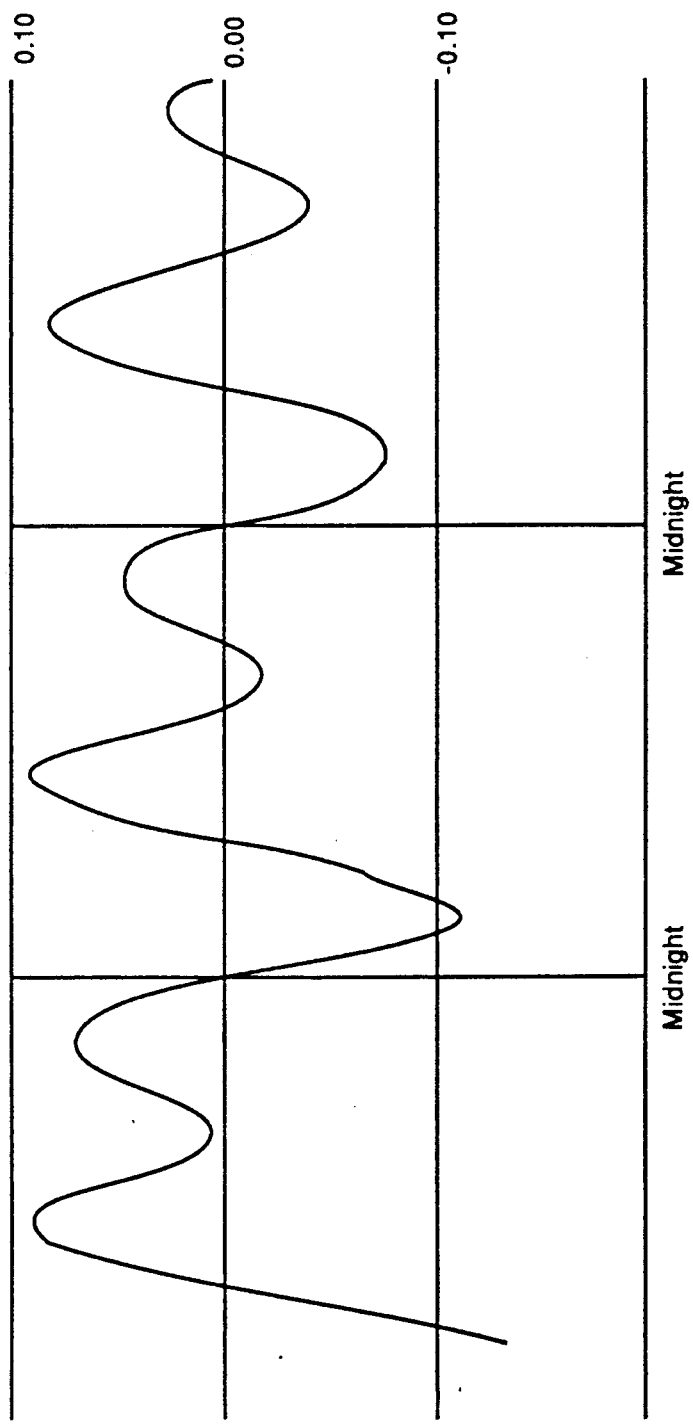
FIG. 3 is a plot of the theoretical earth-tide calculated for a three-day period at Evergreen, Colo. beginning Jan. 10, 1989.

These steps are described in more detail in the example below. A plot of the results of these calculations is shown in FIG. 3.

Alternative Computations

The references for alternative methods to compute the theoretical earth-tide at an arbitrary time and an arbitrary location on the surface of the earth are:
Goguel, J., 1954, A universal table for the prediction of the lunar-solar correction in gravimetry (tidal gravity correction): Geophysical Prospecting, March 1954, volume 2 (supplement), pages 2-31.

Anonymous, 1988, Tidal gravity corrections for 1989; prepared by Service Hydrographique De La Marne and Compagnie Generale De Geophysique as a publication of the European Association of Exploration Geophysicists, The Hague, The Netherlands, Publication Identification Number ISSN 0257-4284, 53 pages.

Harrison, J. C., 1971, New computer programs for the calculation of earth tides; Report of the Cooperative Institute for Research in Environmental Science, University of Colorado (Boulder), 30 pages.

Mr. Jean Goguel has developed a simple and straightforward way to compute values of the gravity response associated with the earth-tide. The basis for the computed values is a set of tables which are published annually by the European Association of Exploration Geophysicists and are applicable to a arbitrary location on the surface of the earth at any time during the appropriate year.

Goguel (1954) provides a single mathematical expression for the earth-tide correction, C. This expression is:

$$C = P + N \cos L (\cos L + \sin L) + S \cos L (\cos L - \sin L)$$

When a high level of accuracy is required for gravity measurements performed on, above, or within the earth, the measured values of gravity are often corrected for earth-tide effects. The theoretical earth-tide values are appropriately computed and subtracted from the measured values of gravity. This correction process (i.e., using an earth-tide correction, C) removes the variations in gravity with time from the measured values and makes it more convenient for use in studying phenomena which are not related to time variations.

L is the latitude of the location on the surface of the earth. The terms P, N, and S are determined by taking entries (entries depend upon time) from the tables such as are found in Anonymous (1988). Thus, for known time and latitude, the correction can be obtained.

Mr. J. C. Harrison has documented a method for computing the values of the earth-tide at locations on the surface of the earth that is similar to the method described above in detail.

The accuracy in a typical computed value of the earth-tide using the technique described by Goguel (1954) is of the order of 10 microgals. The accuracy in a typical computed value using the technique of Harrison (1971) is of the order of one microgal. Either technique could be used instead of the technique for computation used above, which is based upon the paper by Longman (1959).

In addition to these computational methods, it might be possible to develop instrumentation that would directly determine theoretical earth-tide.

The Component of the Response

Using the variable measurements and the determinations for the measurement time period, one can determine at least one component of the reservoir response to tidal forces. By "component of the reservoir response to tidal forces," we mean an independent parameter of the reservoir response to tidal forces. Two components are amplitude of variation and delay time.

Amplitude of Variation

By "amplitude of variation," we mean the amount of change in the measured values which describe the periodic change in the measured variable. By "absolute amplitude of variation," we mean the amplitude of the measured values which describe the periodic change in the measured variable in terms of an absolute reference. The measured values describing the change could be either the direct sensing of the variable or an indirect sensing.

One aspect of the "amplitude of variation" important to the overall invention is the fact that the amplitudes of the pressure, fluid level, or borehole stress measurements are determined in fundamental units. Measured values of pressure, fluid level, or borehole stress can be expressed in terms of the gravity measurements in units of gals.

Delay Time

By "delay time," we mean the lag in time between the actual change in the measured variable and the causative constriction and dilation of the reservoir due mostly to the tidal forces.

The "amplitude of variation" and the "delay time" are two distinct parameters determined simultaneously by comparing either the direct or indirect measurements of the values which are responsive to the theoretical earth-tide. The theoretical earth-tide is appropriately computed at several discrete times (for example every 15 minutes) during the same time period when the actual measurements related to the fluid level variations are performed. It is assumed that the magnification factor is known accurately and is accounted for in the computations of the theoretical earth-tide. It is also assumed that the minor influences due to the loading and unloading of the ocean tide and changes in atmospheric pressure have been appropriately quantified and removed from the data.

Residual Time Serials

Figure 6:
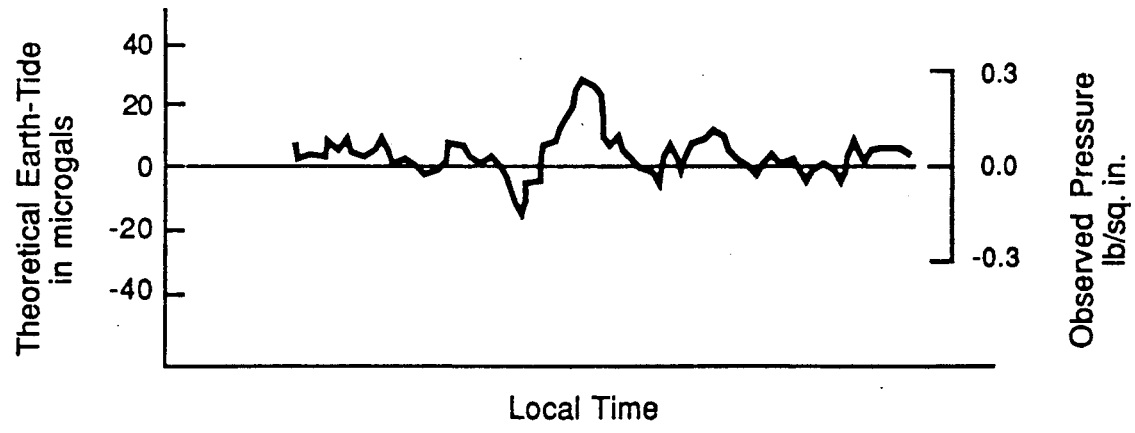
FIG. 6 is a plot of simulated data showing a residual time serials as if the amplitude of variations and the delay time had been factored out of the downhole pressure response.

By "residual time serials," we mean the difference between the theoretical earth-tide and the amplitude-adjusted and time-shifted observed data. FIG. 6 illustrates a residual time serials.

By "anomalous reservoir behavior," we mean a response of the reservoir to tidal forces that deviates, in excess of normal variation, from the expected response which mimics the theoretical earth-tide. Two or more independent residual time serials are required to determine that the information content of a residual time serials includes anomalous reservoir behavior. Anomalous reservoir behavior is established, by one skilled in the art, by studying two or more independently measured residual time serials which have been determined at one or more boreholes.

By "apparent anomalous reservoir behavior," we mean a response of the reservoir to tidal forces that deviates, in excess of normal variation, from the expected response which mimics the theoretical earth-tide but where only one residual time serials is available.

The Removal of Atmospheric and Oceanic Effects

The observed response of the measured variable to the tidal forces should be corrected for atmospheric and oceanic effects before amplitude of variation and delay time are determined.

The prediction of the influence of variations in the load of the oceans and the atmosphere on the constriction and dilation of the reservoir is very difficult. The prediction would require a high level of knowledge of the nature of the rocks which occur above, within, and below the reservoir. It is possible to make very accurate corrections for these influences without this high-level of knowledge. The methods for removing these influences are described below.

The water-tide is similar to the earth-tide in its influence on the constriction and dilation of the reservoir with two important exceptions. These are:
1. The influence of the water-tide is much smaller than the earth-tide. The influence of the water-tide is negligible on land areas which are more than a few miles from shore.
2. The influence of the water-tide lags behind the influence of the earth-tide. This is because of the frictional forces which impede the response of the ocean. The friction is present at the sea bottom and is sufficient to slow the movement of the ocean in response to the changing relative positions of the sun, moon, and a given location on earth.

These two characteristic differences in the influences of the water-tide and the earth-tide are the basis for the method to remove the influence of the water-tide. This method is necessary only for an offshore reservoir and is comprised of the steps listed below:
1. The "tide-tables" used by fishermen and others involved in maritime activities are obtained. From these tables the time-variation of the elevation of the upper surface of the water with respect to mean sea level is extracted for the location of the reservoir and for the appropriate time period.
2. The time-variation of the elevation of the upper surface of the water is compared with the residual time serials factored out of the response to tidal forces.
3. If there is a portion of the residual time serials which compares closely with the time variations of the elevation of the upper surface of the water, then the influence of the water-tide can be removed. If there is no portion of the residual time serials which compares closely with the time variations of the elevation of the water, then there is no need to consider the influence of the water-tide.
4. The relationship that is finally established is the one where there is the least similarity between the residual time serials and the water elevation data.

The technique for removing the influence of the atmospheric effects is much simpler. During the course of the measurements at the reservoir (pressure, fluid level, or borehole stress), the atmospheric pressure is monitored continuously. If there are no appreciable atmospheric pressure variations observed during the appropriate time period, the atmospheric influence is ignored. If there are appreciable changes and the influence is evident on residual time serials, a technique identical with that described above for water-tides is used.

Figure 4:
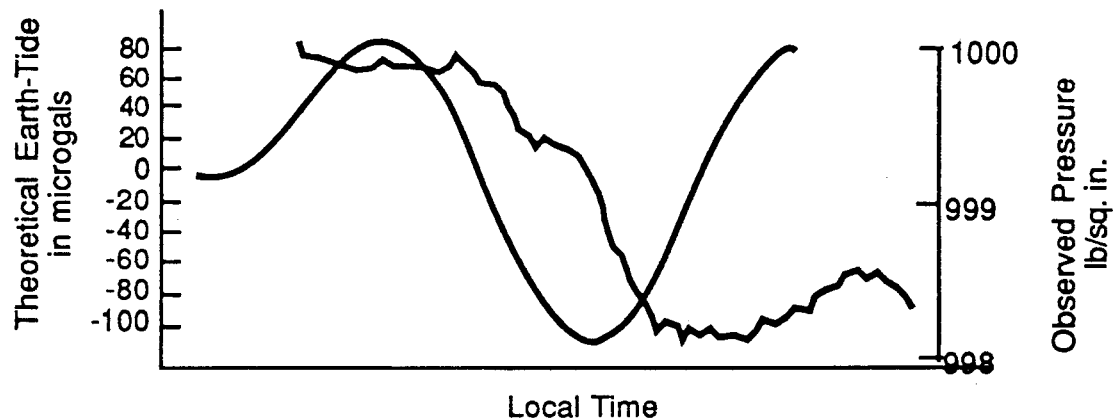
FIG. 4 is a plot of simulated data showing a downhole pressure response and a computed earth-tide response (theoretical earth-tide) appropriate for a reservoir.
Figure 5:
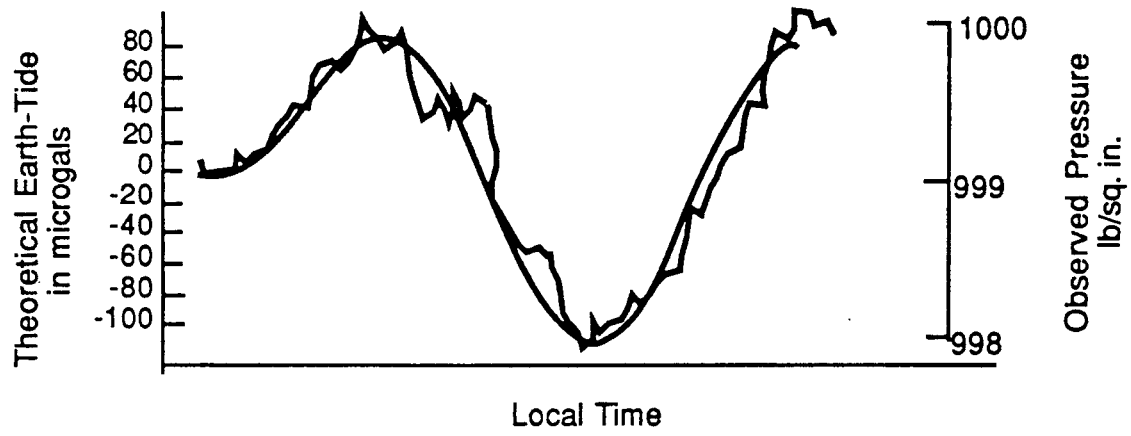
FIG. 5 is a plot of simulated data showing a downhole pressure response as if corrected for instrument drift and as if it has, been adjusted in amplitude and delay time to best fit a theoretical earth-tide response.

Referring to FIGS. 4, 5, and 6, those figures show data that are simulations of hypothetical data. Those three figures are intended to illustrate some basic ideas of how these components are determined. Those figures are exemplary only, and should not be construed as limiting the invention.

FIG. 4

Measured Downhole Pressure Response

The two traces which are plotted in FIG. 4 are:
a downhole pressure response (the solid line), and
a computed earth-tide response appropriate for the particular reservoir (the dotted line).

The downhole pressure response shown in FIG. 4 is a simulation of the type of output signal one might receive from a pressure sensor. FIG. 4 indicates that the instrument drift in the measurement is characterized by an apparent decrease in pressure with time.

The computed theoretical earth-tide response appropriate for the particular reservoir (the dotted line in FIGS. 4 and 5) is the output of the calculations of steps 1 through 25 shown above. The input to those calculations includes the latitude, longitude, and elevation of the reservoir along with the gravity magnification factor which is appropriate for the location of the reservoir.

FIG. 5

FIG. 5 is derived from the information from FIG. 4 and represents the data displayed in FIG. 4 after three simple processing steps have been applied to the measured downhole pressure response. The computed earth-tide response appropriate for the particular reservoir is plotted in FIG. 5 in exactly the same way as in FIG. 4.

The three processing steps are:
1. removing the change in measured downhole pressure response with time due to instrument drift,
2. adjusting the amplitude of the measured downhole pressure response in units of pounds per square inch (where the change in measured downhole pressure response due to instrument drift has been removed) to match the amplitude of the computed earth-tide response, and
3. shifting the entire measured downhole pressure response along the abscissa (horizontal axis in units of time) to the left.

The magnitude of the change in downhole pressure with time is dependent upon the characteristics of the particular pressure sensor. The amplitude of the downhole pressure response relative to the amplitude of the computed earth-tide response is dependent upon the nature of the response of the reservoir to tidal forces. The magnitude of the shift in time of the entire downhole pressure response is dependent upon the nature of the response of the reservoir to tidal forces.

The amplitude of variation can be determined by comparing the scales on the right and left sides of FIG. 5. The delay time can be determined by magnitude of the shift in time applied to the measured downhole pressure response.

FIG. 6

FIG. 6 is derived from the information from FIG. 5. The corrected downhole pressure response (where the instrument drift has been removed, the amplitude has been adjusted, and the time shift has been incorporated) is compared with the computed response to tidal forces in FIG. 5. FIG. 6 shows the difference between the two compared responses where the computed earth-tide response is subtracted from the corrected downhole pressure response.

Note that the time shift that was required to match the responses in FIG. 5 has been augmented by a time shift of the same magnitude in the opposite direction (to the right on FIG. 5). This restoration of the original relationship between the time of observation and the difference between the two responses described above is important because it preserves the appropriate relationship between the response and the time when the response occurred.

The response shown in FIG. 6 is a determination of the residual time serials.

Uses of the Present Invention

The applications of the knowledge gained from determining any of these three parameters (amplitude of variation, delay time, and residual time serials) can be considered in four categories. These categories are:
1. A solitary determination of these parameters at a single borehole.
2. Repeat determinations of these parameters at a single borehole.
3. Solitary determinations of these parameters at each of a set of boreholes in the "same reservoir" (same reservoir includes two or more locations which are even vaguely related).
4. Repeat determinations of these parameters at each of a set of boreholes in the same broadly defined reservoir.

Category One

A solitary determination of these parameters at a single borehole

These parameters for a particular borehole can provide the following diagnostic information:

The absolute amplitude of variations correlates with the volume of reservoir fluid which is in contact with the fluid in the particular borehole.

The delay time correlates with the resistance to fluid flow which is characteristic of the particular borehole.

The residual time serials correlates with the apparent anomalous reservoir behavior which is characteristic of the particular borehole.

By comparing these determinations and all other known determinations of the same component that have been performed anywhere and at anytime in the past, one can make a value judgment about the borehole.

These determinations can be used to derive information pertaining to a condition associated with the borehole where action based upon this information might improve production or otherwise gain efficiency. For instance:

Either a long delay time or the failure to exhibit an appreciable absolute amplitude of variations could indicate low productivity. The appropriate actions in this case might be to abandon the exploration borehole or to stimulate the prospective rocks by inducing fracturing in the rocks.

On the other hand, a short delay time and an appreciable absolute amplitude of variations might be sufficient to warrant further testing or other action with an exploration well, even if formation testing procedures yielded no indication of hydrocarbons.

The delay time for the borehole could provide a basis for scheduling hydrofracing operations. Hydrofracing may be more effective during times when the hydrocarbon reservoir is being dilated by the tidal forces. The computed value of the earth-tide would be insufficient for such scheduling because of the delay between the force of the earth-tide and the actual movement of reservoir fluid. The delay time could also provide a basis for the scheduling of repetitive injection operations aimed at stimulating production.

If apparent anomalous reservoir behavior is observed due to some interesting feature of the residual time serials, then action might follow to make measurements in nearby boreholes to determine the spatial distribution of the anomalous signal.

Category Two

Repeat determinations of the three parameters at a single borehole

The present invention can be used to determine the effectiveness of a production operation in a given borehole in a reservoir. This can be done by determining a component of the response of a reservoir to tidal forces over a first measurement time period, subjecting the reservoir to the production operation after the first measurement time period, determining the same component of the response of the reservoir to tidal forces over a second measurement time period after the beginning of the production operation, and comparing the component of the response of the reservoir to tidal forces for the first and second measurement time periods.

The second measurement time period does not start until the first measurement time period is finished, but the reference time period (if any) may occur at any time in respect to the first and second measurement time periods.

The production operation may begin at any time, but it must continue after the first measurement time period. The second measurement time period must begin after the beginning of the production operation, but it might overlap the production operation. For instance, the production operation could occur throughout the method.

Examples of production operations useful in the present invention include, but are not limited to: steam injection (also called steam flood), water injection (water flood), nitrogen injection, carbon-dioxide injection (carbon-dioxide flood), chemical injection (chemical flood), production of hydrocarbons, natural gas injection, hydrofracing, and cyclic injection of gases or fluids.

These parameters for a particular borehole can provide the following diagnostic information:

Differences in the absolute amplitude of variations would reflect the changes in the volumes of fluid in the particular hydrocarbon reservoir which were in contact with the fluid in the particular borehole.

Differences in the delay times would reflect the changes which have occurred in the resistance to fluid flow in the rocks in the vicinity of the particular borehole.

Differences in the residual time serials would reflect changes in apparent anomalous reservoir behavior.

By studying the differences in these parameters that result from the production operation, one can make a value judgment about the effect of that operation. For instance:

A change in the absolute amplitude of variations (which signifies a change in the volume of reservoir fluid in contact with the borehole) could be a consequence of some production operation such as an inequity between the volume of fluid produced (brought to the surface) and the volume of fluid injected to replace the produced fluid.

A change in the delay time could suggest problems in the borehole environment. An increase in absolute delay time could mean that the effective permeability has decreased. Appropriate action could involve such operations as cleaning the perforations or removing accumulated sand from the borehole.

An increase in absolute amplitude of variation or a decrease in the absolute delay time could reflect a successful production operation, such as an effective realignment of a water flood.

The appearance of some new aspect of anomalous reservoir behavior deduced from a change in the residual time serials could indicate an effect at the borehole due to some production operation that was initiated or modified during the time period over which the residual time serials changed.

Category Three

Solitary determinations of these parameters at each of a set of boreholes in the same reservoir The present invention can be used for comparing at least one element of a reservoir response to tidal forces of at least two boreholes in a reservoir. This is done by determining the gravity magnification factor for the reservoir, determining at least one element of the reservoir response of each of the boreholes to the tidal forces, and comparing those elements of the reservoir response to tidal forces for each of the boreholes.

Detection of one or more of the three situations described below can provide diagnostic information:

The detection of specific portions of the reservoir which are anomalous with respect to the degree to which the appropriate boreholes are in contact with a volume of reservoir fluid.

The detection of specific portions of the reservoir which are anomalous with respect to the degree to which the rocks in the vicinity of the appropriate boreholes indicate resistance to fluid flow.

The detection of specific portions of the reservoir which are characterized by the same or similar residual time serials and thus exhibit the same or similar anomalous reservoir behavior.

By detecting these situations, one can make a value judgment about the reservoir. For instance:

Differences among the volumes of fluid in contact with individual boreholes and differences among the resistances to fluid flow could reveal a spatial pattern which could outline large scale reservoir heterogeneity. Based upon this spatial pattern one might alter the spacing of new boreholes, introduce stimulation technology, or alter flooding practices.

Preferred paths for the subsurface transport of injected fluids could be delineated within a hydrocarbon reservoir. One might try to close-off those preferred fluid paths in order to stimulate production from other portions of the reservoir.

Significant differences in these parameters might reveal whether the feature was a barrier to fluid flow. For example, if the three parameters could be used to establish two distinct groups of boreholes and one group was situated on one side of a major fault and the second group was situated on the other side, then it might be deduced that there was little or no communication across the fault. This is equivalent to saying that the fault is a seal rather than a conduit with respect to fluid flow.

It is difficult to predict the physical properties of a reservoir in portions of the reservoir where there are no boreholes. Often the problem is a lack of sufficient information. A consequence can be that two or more characterizations of the reservoir can be equally probable. By noting the various responses of the three parameters it may be possible to distinguish between two characterizations.

When a new "step-out" well is drilled in an existing oil field, the similarities between the three parameters of the new borehole and boreholes made prior to the new borehole can provide important information. If the three parameters are significantly different, it may be that the new borehole is located in a portion of the reservoir which is separate. An example would be a borehole located in a fault block that was isolated from the rest of the reservoir in terms of fluid flow.

Category Four

Repeat determinations of the three parameters at each of a set of boreholes in the same reservoir The detection of one or more of the three conditions discussed below (time changes in fluid volume in contact, time changes in resistance to fluid flow, and time changes in anomalous behavior) along with a spatial association of the conditions and a specific portion of the reservoir can be considered as providing diagnostic information:

The detection of specific portions of the reservoir which display changes with time in the volume of reservoir fluid which is in contact with the fluid in appropriate boreholes.

The detection of specific portions of the reservoir which display changes with time in the resistance to fluid flow.

The detection of specific portions of the reservoir which display changes in residual time serials between determinations and thus exhibit changes in anomalous reservoir behavior.

This diagnostic information can be used to deduce the existence of certain problems which are detrimental to hydrocarbon production. Other information may be required to deduce the exact nature of the problem.

If the three conditions are measured in a set of wells before the start of a production operation (such as a steam flood), measurements after the operation has begun might reveal the pattern of spatial influence of the operation throughout the hydrocarbon reservoir. Corrective action could be devised on the basis of this information which might improve the efficiency of the operation. For example, this action could involve new selections of boreholes for injection.

If a change is made in the implementation of some production operation, corresponding changes in the three conditions among a set of boreholes could offer a measure of the effectiveness of the implementation change.

If production declines in some area in an unexpected manner, then the three measured conditions in this area, compared with areas with normal production, might provide insight concerning the cause of the diminished production.

The compressibility varies among reservoir fluids. Long-term repeat determinations of the three quantities in a number of boreholes in the same oil or gas field might reveal changes that relate to a changing mix of reservoir fluids. Thus the bulk compressibility would change as the mix of gas, oil, brine, and condensate changed and in turn the absolute amplitude of variations, the delay time, and the anomalous reservoir behavior would change. In the absence of other changes, the nature of the reservoir fluid over time could be determined.

An old field may present a fine opportunity for using passive reservoir-tide observations to better understand the oil field. This is because of the existence of a number of cased wells (usually), the existence of historical production data, and often a lack of the most modern openhole logs.

One opportunity is to track flood fronts and hydrofracing. A consequence of hydrofracing is that the fluid column in a wellbore, which penetrates saturated rocks that have been influenced by hydrofracing, is "connected" with a larger volume of fluid than was the case before hydrofracing. A consequence of an expanding flood (steam, water, chemical or carbon-dioxide) is that fluid which saturates rocks which are "ahead" of the advancing flood gradually becomes "connected" with an increasing volume of subsurface fluid. The act of "connecting" with a larger volume of subsurface fluid increases the amplitude of the periodic rise and fall of the fluid column in response to tidal forces in an appropriately located well.

The "delay" between predicted and measured reservoir-tide signals in a given situation is a measure of the resistance to movement experienced by the fluid in the reservoir as it responds to the tidal forces. The "delay" is in time and is easily represented as a phase angle as commonly used to compare to sinusoidal signals. The increase in amplitude of the rise and fall of the fluid level includes information which is directly relate to the results of hydrofracing or the progress of a flood front. The decrease in the "delay" between the predicted and measured tidal forces response is directly related to the results of hydrofracing or the progress of a flood front.

Other opportunities, in addition to tracking flood fronts and hydrofracing, that might aid in old field development are:

The definition of large-scale heterogeneity in a reservoir.

A gross measure of reservoir volume (or if spatial extent of reservoir is known, a measure of porosity).

A gross measure of reservoir permeability.

The identification of atypical wells.

The detection of change in reservoir volume (porosity) and permeability over the life of the reservoir.

The detection of changes in "connectivity" of reservoir fluids over time such as might be caused by incomplete replacement of produced oil by injected water.

A new oil field provides an opportunity to get on the right track early in the production life of the reservoir. The areas where analysis of reservoir-tide response data might be helpful are: the early definition of an irregular permeability distribution, and the early detection of portions of the reservoir which are not "connected" with other portions.

The determination of a component of the response of the hydrocarbon reservoir to tidal forces could provide an opportunity for a departure from common practice. This inexpensive technique could be employed early in the life of a new field. The information derived from the measurements could be used to derive a plan for long-term hydrocarbon production aimed at optimum long-term production. One of the principal advantages is the fact that the component of the response of the hydrocarbon reservoir is an in situ measurement. The component of the response of the hydrocarbon reservoir is determined in the presence of, and is influenced by, the fault networks, fracture networks, open cracks and dilations, large-scale inhomogeneities, and the existing stress field. All of these are natural features of the reservoir. These features are often not a significant influence upon data derived from cores, logs, and cuttings but they may greatly influence hydrocarbon production. Also implied is a long-term continuous test of reservoir performance over the productive life of the reservoir.

Embodiments Not Using Theoretical Earth-Tide Determinations

While theoretical earth-tide determinations should normally be used in determining a component of the response of a reservoir to tidal forces, it is sometimes possible to get rough information about the reservoir without using theoretical earth-tide determinations.

For instance, one can get a rough approximation of the effectiveness of a production operation in a given borehole in a reservoir:

(a) measuring a variable responsive to tidal forces within the reservoir over a first measurement time period, (b) determining the amplitude of variation of the variable measurements for this first measurement time period, (c) subjecting the reservoir to the production operation after this first measurement time period, (d) measuring the same variable responsive to tidal forces within the reservoir over a second measurement time period after the production operation, (e) determining the amplitude of variation of the variable measurements for this second measurement time period, and (f) comparing the amplitudes of variation of the variable for the first and second measurement time periods.

For the results to be meaningful, the first and second measurement time periods must be sufficiently long so that they both achieve a maximum and minimum variable measurement. If a maximum and minimum variable measurement are not achieved, one cannot accurately determine the amplitude of variation.

The determination step (b) does not have to be done in the order shown above. It could be performed at any time after step (a) but before step (f). For instance, the sequence of steps could be a-c-d-e-b-f.

In this embodiment, the change in amplitude of variation gives a rough indication of the effect of that production operation on the given borehole in a manner similar to the above Category Two.

Another way in which one can get rough information about the reservoir without using theoretical earth-tide calculations is to compare reservoir properties at a number of different boreholes in the same reservoir by:

(a) measuring, at each borehole over a measurement time period, the same variable responsive to tidal forces, (b) determining the amplitude of variation of the variable at each borehole from the variable measurements for the measurement time period, and (c) comparing the amplitudes of variation of the variable at each borehole.

As in the previous embodiment, the measurement time period must be sufficiently long so that it can achieve a maximum and minimum variable measurement. If a maximum and a minimum variable measurement are not achieved, one cannot accurately determine the amplitude of variation.

In this embodiment, the relative differences in amplitude of variation at the boreholes gives a rough indication of how much contact the boreholes have with a volume of reservoir fluid. This is done in a manner similar to the above Category Three.

Still another way in which one can get rough information about the reservoir without using theoretical earth-tide calculations is to compare reservoir properties at a number of different boreholes in the same reservoir by:

(a) measuring, at each borehole over a measurement time period, the same variable responsive to tidal forces, and
(b) determining the relative delay in the variable at each borehole.

By "relative delay", we mean the time delay of a reservoir response to tidal forces in a particular borehole relative to the response to tidal forces observed in a different borehole of the same reservoir. By comparing two boreholes in the same reservoir, it is possible to deduce which of the two boreholes is associated with a greater resistance to the flow of reservoir fluid. If a response to tidal forces in a given borehole is similar in character but delayed in time to that of another borehole, then the resistance to fluid flow is greater in the given well. This concept of comparing responses in two boreholes can be extended to several boreholes of the same reservoir. This is done in a manner similar to the above Category Three.

EXAMPLE OF CALCULATION OF THEORETICAL EARTH-TIDE

Step 1

Organize input data

This includes specification of the desired time for the computations in terms of the Julian century, specification of elevation in meters, and the specification of latitude an longitude in radians. Checking input data is an important step here.

Definition of Input Parameters

Location of place of observation

HT = height above sea-level in $10^6$ meters.
AL = whole degrees of latitude.
AM = minutes of latitude in excess of AL.
OL = whole degrees of longitude.
OM = minutes of longitude in excess of OL.

Time of observations

YRS = last two digits of year for which computations are to be made.
DAYSR = first numerical day of the year for which computations are to be made (i.e. 1 to 366).
HRSR = starting hour in local time for computations.
GMT = coordinated universal time minus local time at place of observation.
TIR = time interval in minutes at which computations are to be made.

Parameters relating to the number of required computations

ND = whole number of days which comprise the period where computations are required.
NPTS = number of computations required in excess of those within the span of ND.

Parameter which specifies the amplification factor

AMPFAC = the gravity magnification factor used to increase the amplitude of the computed earth-tide to account for the elasticity of the earth. The value should fall between 1.13 and 1.24.

Specification of input parameters

The parameters which are specified below offer an example of the complete input which is required for an accurate determination of the earth-tide. In this example, a three-day run begins at 2:00 a.m. on Jan. 10, 1989 in Evergreen, Colo.

HT = 7685.00 ft. × 0.3048 × 0.000001 = 0.002342388
AL = 39.0, AM = 35.5 (latitude of 39° 35.5")
OL = 105.0, OM = 19.0 (longitude of 105° 19")
YRS = 89, DAYSR = 10, HRSR = 2.0 (2:00 a.m. on the morning of Jan. 10, 1989)
GMT = 7 (Mountain Standard Time)
TIR = 15 (do computations for every fifteen minutes)
ND = 3, NPTS = 0 (the time period is three days long)
AMPFAC = 1.165 (the gravity magnification factor)

Documented computations

NPT = maximum number of computations required for one day. 1440 is the number of minutes in one day.

$$NPT = 1440/TIR$$

[in our example, NPT = 96]
TI = time interval at which computations are to be made expressed as a fraction of an hour.

$$TI = TIR/60$$

[in our example, TI = 0.25]
HRSD = starting hour for computations in coordinated universal time (UTC).

$$HRSD = HRSR + GMT$$

[in our example, HRSD = 2 + 7 = 9]
DAYSD = time from 12:00 UTC Dec. 31, 1899 to the beginning of the starting hour (UTC) expressed in days (decimal).
Note that a leap year is any year exactly divisible by 4 unless it is a century year. Only those century years divisible by 400 are leap years. 1900 was not a leap year.

$$DAYSD = YRS \times 365 + DAYSR - 0.5 + INT[(YRS-1)/4] + HRSD/24$$

(The INT function converts a number to an integer number by deleting the fractional part of that number.)
In our example:

$$DAYSD = (89 \times 365) + 10 - 0.5 + INT\left[\frac{89-1}{4}\right] + \frac{9}{24}$$

-continued $$DAYSD = 32485 + 10 - 0.5 + 22 + 0.375 = 32516.875$$

T=time in Julian centuries (36525 days) from Greenwich Mean Noon on Dec. 31, 1899 to the beginning of the starting hour for which the computations are to be made.

$$T = DAYSD/36525$$

[in our example, T=32516.875 /36525=0.890264 Julian centuries]

TA=the fractional part of a Julian century that represents the exact number of years input as years as a fraction of 100 years.

$$TA = INT[T \times 100]/100.$$

[in our example TA=INT[89.0264]/100=0.89 Julian centuries]

TC=the time in years derived from the difference between the elapsed time from Dec. 31, 1899 to the starting hour and the input value "YRS"—this is the fractional portion of the year that has elapsed prior to the computations for that year.

$$TC = (T - TA) \times 100$$

[in our example, TC=(0.890264−0.89)×100=0.0264 years]

TB=the number of degrees beyond a whole number of 360 degree revolutions that have occurred during the period exact period of years equal to the input "YRS."

$$TB = MOD[(TA \times 1336.851), 1] \times 360$$

(The MOD function returns the remainder after a first number is divided by a second number.)

[in our example, TB=287.06 degrees]

AL′=latitude of place of observation in radians (AL=-latitude in whole degrees).

$$AL' = (AL + AM/60) \times 0.01745329$$

[in our example, AL=0.6910048]

Step 2

Compute the distance between the observation point and the geometric center of an ellipsoidal earth R=distance from place of observation to the geometric center of an ellipsoidal earth.
Q=0.00674086, where Q=(A²/B²)−1 and
A=Equatorial radius and
B=Polar radius of earth.

$$R = HT + \frac{6.378139}{\sqrt{1.00674086 - 0.00674086 \times \cos(AL')^2}}$$

[in our example, R=6.3717679]

Steps 3 through 25

The following steps (3 through 25) are repeated every TIR minutes:
LL=total number of computations to be performed.

$$LL = (ND \times NPT) + NPTS$$

[in our example, LL=(3×96)+0=288]

Initialize TL to zero:
TL=cumulative time in terms of the intervals of time specified for the computations. TL is advanced by one TIR (TI=TIR/60) during each iteration.

TL=0.0

Initialize the days in the time duration for the computations by creating an array IDAY equal to 1 through ND.

Do the following steps LL times:
C=the number of degrees that the moon has traversed during the year of the computations up to the starting hour of the computations which are residual to a number of complete 360 degree revolutions (i.e., the fraction of a revolution that the moon has traversed when the computations begin). This is 360×(fractional portion of revolution which has occurred up to the starting hour for the computations)+TB.

$$C = (360 \times MOD[(13.36 \times TC), 1]) + TB$$

[in our example, in the first step, C=413.8°, or keeping it between 0° and 360°, C=53.8°]

Step 3

Compute mean longitude (in degrees) of the moon in its orbit reckoned from the referred equinox Equation (10′) of Longman (1959)

Equation is provided by Schureman (1940, page 162)
S=mean longitude of moon in its orbit reckoned from the referred equinox.

$$S = 270.436590 + C + 307.89057 \times T + 0.001980 \times T^2 + 0.000002 \times T^3$$

[in the first step of our example, S=598.344°, or keeping it between 0° and 360°, S becomes 112.870° or 4.160 radians]

Step 4

Compute mean longitude of lunar perigee

The sidereal month is 27.321661 days. The anomalistic month is 27.5545505 days or about 0.233+ day longer. The anomalistic month is measured from perigee to perigee. The difference in time frames accumulates about 11+ revolutions per Julian century.
C′=fractional part of the number of revolutions accumulated because of the difference in the time frames (sidereal vs. anomalistic) that is residual to the complete revolutions, expressed in degrees.

$$C' = 360 \times MOD[(11 \times T), 1]$$

[in our example, in the first step, C′=285.444°]

Equation (11′) of Longman (1959)

Equation is provided by Bartels (1957, page 747)
P=mean longitude of lunar perigee in degrees.

$$P = 334.329560 + C' + 109.03403 \times T - 0.010320 \times T^2 - 0.00001 \times T^3$$

[in the first step of our example, P=716.834°, or keeping it between 0° and 360°, P becomes 356.834° or 6.228 radians]

Step 5

Compute mean longitude of the sun

Equation (12') of Longman (1959)

Equation is provided by Bartels (1957, page 747)
H = mean longitude of sun in degrees.

$$H = 279.69668 + (360 \times TC) + 0.76892 \times T + 0.00030 \times T^2$$

[in the first step of our example, H = 289.868°, or keeping it between 0° and 360°, H stays 289.868° or 5.059 radians].

Step 6

Compute longitude of moon's ascending node in its orbit reckoned from the referred equinox The time elapsed between successive passages of the moon through a node is called the nodical month. The nodical month is 27.212220 days. The year with respect to the vernal equinox is the tropical year. The tropical month is 27.3215817 days. The difference in time frames accumulates about 5+ revolutions per Julian century. C'' = fractional part of the accumulated number of revolutions of the moon that have occurred because of the difference in time frames (nodical vs. tropical) up to the time of the computation (from Greenwich noon on Dec. 31, 1899) expressed in degrees.

$$C' = 360 \times MOD[(5 \times T), 1]$$

[in the first step of our example, C'' = 162.474]

Equation (19') of Longman (1959)

Equation is provided by Bartels (1957, page 747)
OLN = longitude of moon's ascending node in its orbit reckoned from the referred equinox in radians.

$$OLN = 259.183280 - C' - (134.14201 \times T) + (0.00208 \times T^2) + (0.000002 \times T^3) \text{ degrees}$$

[in the first step of our example, OLN = −22.711°, or keeping it between 0° and 360°, OLN becomes 337.299° or 5.8868 radians]

Step 7

Specify the inclination of the moon's orbit to the equator.

Equations (20) and (21) of Longman (1959)

$$CI = \cos(I) = \cos(W)\cos(I') - \sin(W)\sin(I')\cos(OLN)$$

where:
I = inclination of the moon's orbit to the equator
W = inclination of earth's equator to ecliptic (23.452 degrees)
I' = inclination of moon's orbit to ecliptic (5.145 degrees)

$$0.913698 = \cos(23.452) \times \cos(5.145)$$

$$0.0356895 = \sin(23.452) \times \sin(5.145)$$

$$CI = 0.913698 - 0.0356895 \times \cos(OLN)$$

[in the first step of our example, CI = 0.880776]

$$SI = \sin(I) = (1 - CI^2)^{\frac{1}{2}}$$

[in the first step of our example, SI = 0.473534]

SN = argument of arcsine in equation (21) of Longman (1959) = sin(V) where V = longitude in the celestial equator of its intersection, A, with the moon's orbit (see FIG. 1 of Longman (1959)).

$$\sin(5.145°) = 0.089677$$

$$SN = 0.089677 \times \sin(OLN)/SI$$

[in the first step of our example, SN = −0.073116]

$$CN = \cos(V) = (1 - SN^2)^{\frac{1}{2}}$$

[in the first step of our example, CN = 0.997323]

Step 8

Specify the side of the spherical triangle connecting the nodes where the moon's ascending node is one and the ascending intersection of the moon's orbit with the equator is the other. (This side is commonly named "α")

Equation (16) of Longman (1959)

SIT = sin(α), where α is the side of the spherical triangle defined by two specific nodes. The moon's ascending node is one and the ascending intersection of the moon's orbit with the equator
sin(ω) = 0.397981, where ω is the inclination of the earth's equator to the ecliptic (23.452 degrees).

$$SIT = 0.397981 \times (\sin(OLN)/SI$$

[in the first step of our example, SIT = −0.324486]

Equation (15) of Longman (1959)

$$CIT = \cos(α)$$

$$\cos(ω) = 0.917394$$

$$CIT = (\cos(OLN) \times CN) + (0.917394 \times \sin(OLN) * SN)$$

[in the first step of our example, CIT = 0.945891]

Equation (17) of Longman (1959)

$$TIT = \tan(α/2) = \sin(α)/(1 + \cos(α)).$$

This is a standard trigonometric identity—for example see Dwight (1961, page 83, identity 406.2).

$$TIT = SIT/(1 + CIT)$$

[in the first step of our example, TIT = −0.166754]

Equation (18) of Longman (1959)

ET = α "uniquely determined" see discussion in Longman (1959, page 2354) where this is carefully explained—in radians (if negative, add 2π)
2π = 6.2831853

$$ET = 2 \times \tan(TIT)$$

[in the first step of our example, ET = −0.336635]

Step 9

Compute the longitude in the moon's orbit of its ascending intersection with the celestial equator Equation (14) of Longman (1959)

CXI = longitude in the moon's orbit of its ascending intersection with the celestial equator in radians.

$$CXI = OLN - ET$$

[in the first step of our example, CXI = 6.223435]

Step 10

Compute the mean longitude of the moon (in radians) in its orbit reckoned from the ascending intersection of the moon's orbit with the equator Equation (13) of Longman (1959)

SIG = mean longitude of moon in its orbit reckoned from A (see FIG. 1 of Longman (1959))—in radians.

$$SIG = S - CXI$$

[in the first step of our example, SIG = −2.063548]

Step 11

Compute the longitude of the moon in orbit reckoned from its ascending intersection with the equator.

Equation (9) of Longman (1959)

Equation provided by Schureman (1940, page 19)
OLM = longitude of moon in orbit reckoned from its ascending intersection with the equator in radians.
for the purposes of explaining the constants immediately below
E = eccentricity of moon's orbit input as 0.054900489
and
M = ratio of the mean motion of the sun to that of the moon = 0.074801323 (27.321662/365.2564) dimensionless. Note that in general sidereal time is reckoned in relation to the the "fixed" stars. The value of M is the ratio of the sidereal period of the moon (month) to that of the earth about the sun. The sidereal period of the moon is provided by Parker (1984) and McGraw-Hill (1987): 27 days, 7 hours, 43 minutes, and 11.6 seconds. This is 27.3216620 days. The sidereal year, 365.2564 days, is provided by Parker (1989)

0.109800978 = 2 × E
0.00376757962 = 5 × E²/4
0.0153998595 = 15 × M × E/4
0.00769345214 = 11 × M²/8

$$OLM = SIG + (0.109800978 \times \sin(S - P)) +$$
$$0.00376757962 \times \sin(2 \times (S - P) +$$
$$0.0153998595 \times \sin(S - 2 \times H + P) +$$
$$0.00769345214 \times \sin(2 \times (S - H))$$

[in the first step of our example, OLM = −2.160288]

Step 12

Compute the longitude of the point on the celestial equator of its intersection with the moon's orbit Variation of Equation (21) of Longman (1959)

The sine of the angle V is computed in step 7 above and uses equation (21) of Longman (1959); the equation below is a simple extension of this computation using the inverse tangent.

$$V = \tan(SV/((1 - SV^2)^{\frac{1}{2}}))$$

[in the first step of our example, V = −0.073444]

Step 13

Compute the hour angle of the mean sun measured westward from the place of observation Equation (24) of Longman (1959)

TO = accumulated incremental time from the starting hour of the computation.
HA = hour angle of mean sun measured westward from the place of observation in degrees.
OL + OM/60 = the longitude of the place of observation in degrees.

The hour angle of a celestial object is the angular distance between the local celestial meridian and the hour circle of the object, measured westward along the celestial equator. The hour circle is the great circle that passes through the celestial object and the celestial north and south poles.

Sidereal time is equal to the hour angle of the vernal equinox. For practical reasons, this relationship is not the basis for a constant unit of time. In order to adopt a useful constant unit of time based on the sun, astronomers envision and employ a fictitious sun which is assumed to move uniformly along the celestial equator through the course of one year. The hour angle of this fictitious sun is a measure of mean solar time. Since it is more convenient to begin a day at midnight than at noon, mean solar time is set equal to the hour angle of the mean sun plus 12 hours.

The hour angle increases at a rate of about 15.0 degrees per hour. The hour angle ranges from 0 to 360 degrees but unlike the right ascension is measured westward.

The formula is a statement of an astronomical definition: the local hour angle equals the Greenwich hour angle minus west longitude. The 12 hour shift is that which is explained above.

$$TO = TL + GMT$$

[in the first step of our example, TO = 7]

$$HA = 0.01745329 \times [15 \times (TO - 12) - OL - OM/60]$$

[in the first step of our example, HA = −3.147119 radians]

Step 14

Compute the right ascension of the meridian of the place of observation reckoned from the ascending intersection of the moon's orbit with the equator Equation (23) of Longman (1959)

CHI = right ascension of meridian of place of observation reckoned from A (see FIG. 1 of Longman (1959, page 2353))—in radians.

$$CHI = HA + H - V$$

[in the first step of our example, CHI = 1.985477 radians]

Step 15

Specify the zenith angle of the moon

Equation (7) of Longman (1959)

CT = cosine of zenith angle of moon.

$$CT = \sin(AL') \times SI \times \sin(OLM) +$$
$$\cos(AL') \times [(1 + CI) \times \cos(OLM - CHI)/2 +$$
$$(1 - CI) \times \cos(OLM + CHI)/2]$$

[in the first step of our example, CT = −0.594609]

Step 16

Compute the reciprocal of the distance between the centers of the earth and the moon Equation (29) of Longman (1959)

Modification of Equation (52) page 20 of Schureman (1940)

DA = reciprocal of distance between centers of the earth and the moon.

For the purpose of defining the numerical constants immediately below, consider the following definitions of terms:

$C_{em}$ = mean distance from centers of earth and moon = $3.84405 \times 10^{10}$ cm Stacy (1977, page 332).

$A'' = 1/(C_{em} \times (1 - E^2)) = 2.6092875 \times 10^{-11}$ cm$^{-1}$ [Equation (31) of Longman]

2.601423 = reciprocal of the mean distance between the centers of the earth and moon in units of $10^{-11}$ cm$^{-1}$ 0.14325116 = $A'' \times E$ in units of $1 \times 10^{-11}$ cm$^{-1}$ 0.0078645587 = $A'' \times E^2$ in units of $1 \times 10^{-11}$ cm$^{-1}$ 0.02009133 = $(15/8) \times A'' \times M \times E$ in units of $1 \times 10^{-11}$ cm$^{-1}$ 0.01459958 = $A'' \times M^2$ in units of $1 \times 10^{-11}$ cm$^{-1}$ The units of DA are $1 \times 10^{-11}$ cm$^{-1}$ $$DA = 2.601423 + 0.14325116 \times \cos(S - P) +$$
$$0.0078645587 \times \cos(2 \times (S - P)) +$$
$$0.02009133 \times \cos(S - 2 \times H + P) +$$
$$0.01459958 \times \cos(2 \times (S - H))$$

[in the first step of our example, DA = 2.544876]

Step 17

Compute the vertical component (upwards away from center of earth) of the lunar tidal force per unit mass at the place of observation Equation (1) of Longman (1959)

GM = vertical component (upwards) of the lunar tidal force per unit mass at the place of observation in milligals.

0.4902753 = product of universal gravitational constant and the mass of the moon - as indicated below: $K \times M'$ 0.000735413 = product directly above multiplied by 3/2

$K = 6.6732 \times 10^{-8}$ cm$^3$ gm$^{-1}$ sec$^{-2}$ from Stacy (1977, p. 331)

$M' = 7.34693 \times 10^{25}$ gm (revised constant from Stacy (1977, p. 332))

The units of $K \times M'$ are $1 \times 10^{19}$ cm$^3$ sec$^{-2}$ $$GM = 0.4902753 \times R \times DA^3 \times (3 \times CT^2 - 1) +$$
$$0.00735413 \times R^2 \times DA^4 \times (5 \times CT^3 - 3 \times CT)$$

[in the first step of our example, GM = 4.041688]

Step 18

Compute the eccentricity of the earth's orbit

Equation (27) of Longman (1959)

ES = eccentricity of earth's orbit.

$$ES = 0.01675104 - 0.00004180 \times T - 0.000000126 \times T^2$$

[in the first step of our example, ES = 0.016714]

Step 19

Compute mean longitude of solar perigee

Equation (26') of Longman (1959)

PS = mean longitude of solar perigee.

$$PS = 281.22083 + 1.71902 \times T + 0.00045 \times T^2 + 0.000003 \times T^3$$

[in the first step of our example, PS = 282.751°, or keeping it between 0° and 360°, PS stays 282.751° or 4.934945 radians]

Step 20

Compute the longitude of the sun in the ecliptic reckoned from the vernal equinox Equation (25) of Longman (1959)

OLS = longitude of sun in ecliptic reckoned from vernal equinox in radians.

$$OLS = H + 2 \times ES \times \sin(H - PS)$$

[in the first step of our example, OLS = 5.063293]

Step 21

Compute the right ascension of the meridian of the place of observation reckoned from the vernal equinox Equation (28) of Longman (1959)

CHIS = right ascension of meridian of point of observation reckoned from the vernal equinox (in radians).

$$CHIS = HA + H$$

[in the first step of our example, CHIS = 1.912033]

Equation (30) of Longman (1959)

DS = reciprocal of distance between centers of the earth and the sun.

0.6684587 = 1/1.4959787 = The mean distance between the earth and the sun is taken from Parker (1984) to be 149,597,870.7 kilometers; thus a value of $1.495978707 \times 10^{13}$ cm is used instead of the $1.495000 \times 10^{13}$ cm of Pettit (1954) used by Longman (1959).

$$DS = 0.6684587 + 0.6684587 \times ES \times \cos(H - PS)/(1 - ES^2)$$

[in the first step of our example, DS = 0.679548]

Step 22

Specify the zenith angle of the sun

Equation (8) of Longman (1959)

CF = cosine of zenith angle of sun.
sin(23.452 degrees) = 0.397981
23.452 = inclination of the earth's equator to the ecliptic (degrees).
0.958697 = cos(23.452/2) × cos(23.452/2)
0.041303 = sin(23.452/2) × sin(23.452/2)

$$CF = 0.397981 \times \sin(AL') \times \sin(OLS) +$$
$$\cos(AL') \times (0.958697 \times \cos(OLS - CHIS) +$$
$$0.041303 \times \cos(OLS + CHIS))$$

[in the first step of or example, CF = −0.952421]

Step 23

Compute the vertical component (upwards away from center of earth) of the solar tidal force per unit mass at the place of observation Equation (3) of Longman (1959)

GS = vertical component (upwards) of the solar tidal force per unit mass at the place of observation in milligals.
13.27139 = product of universal gravitational constant and the mass of the sun—as indicated below: K × S.
S = 1.98876 × 10^33 gm (revised constant from Stacy (1977, p. 332)).
The units of K × S are 1 × 10^25 cm^3 sec^−2

$$GS = 13.27139 \times R \times (3 \times CF^2 - 1) \times DS^3$$

[in the first step of our example, GS = 45.677041]

Step 24

Combine the computed vertical components (steps 17 and 23) along with the magnification factor to compute the vertical component of the gravitational attraction at the place of observation due to the moon and the sun Compute the gravitational attraction and account for the elastic response of the earth to the earth-tide by using the magnification factor.

One element used in the calculation of the theoretical earth-tide is the gravity magnification factor of a reservoir. That factor is independent of time and is relatively consistent over an entire reservoir. This means that once the value of that factor is known, it can be used any time, any place within that reservoir.

The magnification factor is related to the so-called "Love" numbers which bear the name of A. E. H. Love who described them in his book published in 1911. The "Love" numbers are normally represented by the symbols K and H. The magnification factor is (1 − (3/2) × K + H) and is dimensionless. The numerical value of the magnification factor is not a constant and varies according to the distribution of elastic properties in the crust. H. Takeuchi (1950) studied available data and concluded that the bounds and "best" values are:

0.29 ≧ K ≧ 0.28 ("best" K = 0.29)

0.61 ≧ H ≧ 0.59 ("best" H = 0.61)

the "best" values result in an amplification factor of 1.175. Other reported values include a range for K of 0.299 to 0.306 and a range for H of 0.607 to 0.619. Using all of the above data the range for the amplification factor is 1.131 to 1.199. The range of amplification factors that has been used historically is 1.13 to 1.24.

Preferably, the theoretical earth-tide for the reservoir is calculated using a calibrated gravity magnification factor determined by measuring a calibrated gravity at the reservoir over a reference time period, calculating a first approximation of the theoretical earth-tide for the reservoir over that reference time period using an arbitrary gravity magnification factor, and calculating the calibrated gravity magnification factor for the reservoir from the gravity measurements and the first approximation of the theoretical earth-tide calculations.

Preferably, the calibrated gravity is the calibrated relative gravity. The calibrated absolute gravity can be used, but the calibrated relative gravity is preferred because calibrated relative gravity meters are more portable and are less expensive.

As mentioned above, the reference time period should be sufficiently long so that both a maximum and minimum variable measurement is achieved during that time period. Preferably, the reference time period used in determining the gravity magnification is at least fourteen hours long. More preferably, it is at least twenty-four hours long.

While the use of a calibrated gravity magnification factor is preferred, it is possible to achieve a rough approximation of the response to the earth-time using an arbitrary gravity magnification factor in the calculation of theoretical earth-tide.

Step 25

Organize the result of Step 24 with respect to the appropriate sign convention

Signs of GM and GS are reversed for compatibility with gravity measurements (positive vertical component is downward)

GRAV = the vertical component of the gravitational attraction at the place of observation due to the sun and the moon. This is the effect; not the correction.

$$GRAV = AMPFAC \times (-GM - GS)$$

[in the first step of our example, GRAV = −57.922319]

The above methodology for determining theoretical earth-tide was used to calculate the theoretical earth-tide for a three-day run at Evergreen, Colo. starting on Jan. 10, 1989. A plot of the results of these calculations is shown in FIG. 3.

While the present invention has been described with reference to specific embodiments, this application is intended to cover those various changes and substitutions which may be made by those skilled in the art without departing from the spirit and scope of the appended claims.

What is claimed is:

1. A method for determining a component of the response of a hydrocarbons reservoir to tidal forces comprising:
    (a) measuring a variable responsive to tidal forces within said reservoir over a measurement time period;

(b) determining a theoretical earth-tide for said reservoir over said measurement time period; and (c) determining said component of the response to tidal forces by comparing said variable measurements and said theoretical earth-tide determinations.

2. A method for determining a component of the response of a hydrocarbons reservoir to tidal forces according to claim 1 wherein said variable responsive to tidal forces is fluid level within a borehole.

3. A method for determining a component of the response of a hydrocarbons reservoir to tidal forces according to claim 1 wherein said variable responsive to tidal forces is pressure.

4. A method for determining a component of the response of a hydrocarbons reservoir to tidal forces according to claim 3 wherein said pressure comprises a pressure measured within the liquid phase of said reservoir.

5. A method for determining a component of the response of a hydrocarbons reservoir to tidal forces according to claim 4 wherein said pressure further comprises a pressure measured outside of the liquid phase of said reservoir.

6. A method for determining a component of the response of a hydrocarbons reservoir to tidal forces according to claim 1 wherein said variable responsive to tidal forces is borehole stress.

7. A method for determining a component of the response of a hydrocarbons reservoir to tidal forces according to claim 1 wherein said measurement time period is sufficiently long so that both a maximum and minimum variable measurement is achieved during that time period.

8. A method for determining a component of the response of a hydrocarbons reservoir to tidal forces according to claim 7 wherein said measurement time period is at least fourteen hours long.

9. A method for determining a component of the response of a hydrocarbons reservoir to tidal forces according to claim 8 wherein said measurement time period is at least twenty-four hours long.

10. A method for determining a component of the response of a hydrocarbons reservoir to tidal forces according to claim 1 wherein said variable responsive to tidal forces is measured continuously throughout said measurement time period.

11. A method for determining a component of the response of a hydrocarbons reservoir to tidal forces according to claim 1 wherein said variable responsive to tidal forces is measured at least every fifteen minutes throughout said measurement time period.

12. A method for determining a component of the response of a hydrocarbons reservoir to tidal forces according to claim 1 wherein said component of the response to tidal forces comprises the amplitude of variation of said response.

13. A method for determining a component of the response of a hydrocarbons reservoir to tidal forces according to claim 1 wherein said component of the response to tidal forces comprises the delay time of said response.

14. A method for determining a component of the response of a hydrocarbons reservoir to tidal forces according to claim 1 wherein said component of the response to tidal forces is the combination of the amplitude of variation of said response and the delay time of said response; and wherein said component of the response to tidal forces is factored out from said variable measurements to reveal a residual time serials.

15. A method for determining a component of the response of a hydrocarbons reservoir to tidal forces according to claim 1 wherein said component of the response to tidal forces is selected from the group consisting of:

the amplitude of variation of said response, the delay time of said response, and a combination thereof.

16. A method for determining a component of the response of a hydrocarbons reservoir to tidal forces according to claim 1 wherein said theoretical earth-tide is calculated using a calibrated gravity magnification factor.

17. A method for determining a component of the response of a hydrocarbons reservoir to tidal forces according to claim 16 wherein said calibrated gravity magnification factor is determined by:

(a) measuring calibrated gravity at said reservoir over a reference time period, (b) determining a first approximation of the theoretical earth-tide for said reservoir over said reference time period using an arbitrary gravity magnification factor, and (c) determining the calibrated gravity magnification factor for said reservoir by comparing said gravity measurements and said first approximation of the theoretical earth-tide determinations.

18. A method for determining a component of the response of a hydrocarbons reservoir to tidal forces according to claim 17 wherein said calibrated gravity is the calibrated relative gravity.

19. A method for determining a component of the response of a hydrocarbons reservoir to tidal forces according to claim 17 wherein said reference time period is sufficiently long so that both a maximum and minimum gravity measurement is achieved during that time period.

20. A method for determining a component of the response of a hydrocarbons reservoir to tidal forces according to claim 19 wherein said reference time period is at least fourteen hours long.

21. A method for determining a component of the response of a hydrocarbons reservoir to tidal forces according to claim 20 wherein said reference time period is at least twenty-four hours long.

22. A method for determining a component of the response of a hydrocarbons reservoir to tidal forces according to claim 16 wherein said component of the response to tidal forces comprises the absolute amplitude of variation of said response.

23. A method for determining the effectiveness of at least one production operation in a given borehole in a hydrocarbons reservoir comprising:

(a) determining a component of the response of a hydrocarbons reservoir to tidal forces over a first measurement time period, (b) subjecting said reservoir to said production operation after said first measurement time period, (c) determining the same component of the response of the reservoir to tidal forces over a second measurement time period after said first measurement time period and after the beginning of said production operation, and (d) comparing said component of the response of the reservoir to tidal forces for said first and second measurement time periods.

24. A method for determining the effectiveness of at least one production operation in a given borehole in a hydrocarbons reservoir according to claim 23 wherein said component of the response of the reservoir to tidal forces is determined by the steps comprising:
  (a) measuring a variable responsive to tidal forces within said reservoir over said measurement time periods;
  (b) determining a theoretical earth-tide for said reservoir over said measurement time periods; and
  (c) determining said component of the response to tidal forces by comparing said variable measurements and said theoretical earth-tide determinations.

25. A method for determining the effectiveness of at least one production operation in a given borehole in a hydrocarbons reservoir according to claim 24 wherein said measurement time periods are sufficiently long so that both a maximum and minimum variable measurement is achieved during each time period.

26. A method for determining the effectiveness of at least one production operation in a given borehole in a hydrocarbons reservoir according to claim 25 wherein said first and second measurement time periods are both at least fourteen hours long.

27. A method for determining the effectiveness of at least one production operation in a given borehole in a hydrocarbons reservoir according to claim 26 wherein said first and second measurement time periods are both at least twenty-four hours long.

28. A method for determining the effectiveness of at least one production operation in a given borehole in a hydrocarbons reservoir according to claim 24 wherein said variable responsive to tidal forces is measured continuously throughout said measurement time periods.

29. A method for determining the effectiveness of at least one production operation in a given borehole in a hydrocarbons reservoir according to claim 24 wherein said variable responsive to tidal forces is measured at least every fifteen minutes throughout said measurement time periods.

30. A method for determining the effectiveness of at least one production operation in a given borehole in a hydrocarbons reservoir comprising:
  (a) measuring a variable responsive to tidal forces within said reservoir over a first measurement time period, wherein said first measurement time period is sufficiently long so that both a maximum and minimum variable measurement is achieved during that time period;
  (b) determining the amplitude of variation of said variable measurements for said first measurement time period;
  (c) subjecting said reservoir to said production operation after said first measurement time period,
  (d) measuring the same variable responsive to tidal forces within said reservoir over a second measurement time period after said first measurement time period and after the beginning of said production operation, wherein said second measurement time period is sufficiently long so that both a maximum and minimum variable measurement is achieved during that time period;
  (e) determining the amplitude of variation of said variable measurements for said second measurement time period; and
  (f) comparing said amplitudes of variation of the variable for said first and second measurement time periods.

31. A method for comparing reservoir properties in at least two different boreholes in the same hydrocarbons reservoir comprising:
  (a) determining the same component of the response of the reservoir to tidal forces at each of said boreholes,
  (b) comparing the same component of the response for each of said boreholes.

32. A method for comparing reservoir properties in at least two different boreholes in the same hydrocarbons reservoir according to claim 31 wherein said component of the response of the reservoir to tidal forces is determined by the steps comprising:
  (a) measuring a variable responsive to tidal forces at each of said boreholes within said reservoir over a measurement time period;
  (b) determining a theoretical earth-tide for said reservoir over said measurement time period; and
  (c) determining said component of the response to tidal forces by comparing said variable measurements and said theoretical earth-tide determinations.

33. A method for comparing reservoir properties in at least two different boreholes in the same hydrocarbons reservoir comprising:
  (a) measuring, at each borehole over a measurement time period, the same variable responsive to tidal forces, wherein said measurement time period is sufficiently long so that both a maximum and minimum variable measurement is achieved during that time period;
  (b) determining the amplitude of variation of the variable at each borehole from said variable measurements for said measurement time period;
  (c) comparing the amplitudes of variation of the variable at each borehole.

34. A method for comparing reservoir properties at least two different boreholes in the same hydrocarbons reservoir comprising:
  (a) measuring, at each borehole over a measurement time period, the same variable responsive to tidal forces; and
  (b) determining the relative delay in the variable at each borehole.

35. A method for determining the spatial effectiveness of at least one production operation in a hydrocarbons reservoir comprising:
  (a) determining a component of the response of a hydrocarbons reservoir to tidal forces at a plurality of boreholes over a first measurement time period,
  (b) subjecting said reservoir to said production operation after said first measurement time period,
  (c) determining the same component of the response of the reservoir to tidal forces at said boreholes over a second measurement time period after said first measurement time period and after the beginning of said production operation, and
  (d) comparing said component of the response of the reservoir to tidal forces for said first and second measurement time periods for each borehole to determine the spatial effectiveness of that production operation.

36. A method for determining the spatial effectiveness of at least one production operation in a hydrocarbons reservoir according to claim 35 wherein said component of the response of the reservoir to tidal forces is determined by the steps comprising:
  (a) measuring a variable responsive to tidal forces within said reservoir over said measurement time periods;
  (b) determining a theoretical earth-tide for said reservoir over said measurement time periods; and
  (c) determining said component of the response to tidal forces by comparing said variable measurements and said theoretical earth-tide determinations.

37. A method for determining the spatial effectiveness of at least one production operation in a hydrocarbons reservoir comprising:
  (a) measuring a variable responsive to tidal forces at a plurality of boreholes within said reservoir over a first measurement time period, wherein said first measurement time period is sufficiently long so that both a maximum and minimum variable measurement is achieved during that time period;
  (b) determining the amplitudes of variation of said variable measurements for said first measurement time period;
  (c) subjecting said reservoir to said production operation after said first measurement time period,
  (d) measuring the same variable responsive to tidal forces at said boreholes within said reservoir over a second measurement time period after said first measurement time period and after the beginning of said production operation, wherein said second measurement time period is sufficiently long so that both a maximum and minimum variable measurement is achieved during that time period;
  (e) determining the amplitudes of variation of said variable measurements for said second measurement time period; and
  (f) comparing said amplitudes of variation of the variable for said first and second measurement time periods for each borehole to determine the spatial effectiveness of that production operation.

* * * * *